United States Patent
Gang et al.

(10) Patent No.: US 11,997,460 B2
(45) Date of Patent: May 28, 2024

(54) ELECTRONIC DEVICE FOR AUDIO INPUT AND METHOD FOR OPERATING THE SAME

(71) Applicant: Samsung Electronics Co., Ltd., Gyeonggi-do (KR)

(72) Inventors: Myeongwan Gang, Gyeonggi-do (KR); Jaehyun Kim, Gyeonggi-do (KR); Sangsoo Park, Gyeonggi-do (KR); Hakhoon Song, Gyeonggi-do (KR); Dongmoon Ok, Gyeonggi-do (KR); Byeongjun Kim, Gyeonggi-do (KR); Kyoungho Bang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 17/568,171

(22) Filed: Jan. 4, 2022

(65) Prior Publication Data
US 2022/0295178 A1    Sep. 15, 2022

Related U.S. Application Data

(63) Continuation of application No. PCT/KR2021/019245, filed on Dec. 17, 2021.

(30) Foreign Application Priority Data

Mar. 12, 2021    (KR) .................. 10-2021-0032791

(51) Int. Cl.
  *H04R 3/00*    (2006.01)
  *H04R 3/04*    (2006.01)
  *H04R 3/12*    (2006.01)

(52) U.S. Cl.
  CPC .............. *H04R 3/005* (2013.01); *H04R 3/04* (2013.01); *H04R 3/12* (2013.01)

(58) Field of Classification Search
  None
  See application file for complete search history.

(56) References Cited

U.S. PATENT DOCUMENTS

| 10,694,304 B2 | 6/2020 | Maziewski et al. |
| 10,743,107 B1 | 8/2020 | Yoshioka et al. |

(Continued)

FOREIGN PATENT DOCUMENTS

| EP | 2 795 930 B1 | 1/2020 |
| JP | 2017-139767 A | 8/2017 |

(Continued)

OTHER PUBLICATIONS

International Search Report dated Mar. 30, 2022.
European Search Report dated Apr. 8, 2024.

*Primary Examiner* — James K Mooney
(74) *Attorney, Agent, or Firm* — Cha & Reiter, LLC

(57) ABSTRACT

An electronic device and method are disclosed. The electronic device includes an internal microphone, a communication module, and at least one processor. The processor implements the method, including: receiving, through the communication module, a first audio signal input through an external microphone included in an external electronic device communicatively connected to the electronic device, activating the internal microphone in response to detecting a device switch event switching from the external microphone to the internal microphone while receiving the first audio signal, receiving a second audio signal input through the internal microphone, synchronizing and mixing the first audio signal and the second audio signal during a designated first time period, and deactivating the external microphone upon detecting lapse of the designated first time period.

20 Claims, 13 Drawing Sheets

(56) References Cited

U.S. PATENT DOCUMENTS

| | | |
|---|---|---|
| 10,825,480 B2 | 11/2020 | Marco et al. |
| 2009/0190769 A1* | 7/2009 | Wang ..................... H03G 3/32 |
| | | 381/66 |
| 2009/0238377 A1 | 9/2009 | Ramakrishnan et al. |
| 2010/0074449 A1* | 3/2010 | Tabata ................... H04R 3/005 |
| | | 381/1 |
| 2012/0013768 A1 | 1/2012 | Zurek et al. |
| 2013/0226593 A1* | 8/2013 | Magnusson ............ H04N 9/806 |
| | | 704/276 |
| 2014/0133666 A1 | 5/2014 | Tanaka et al. |
| 2016/0309283 A1* | 10/2016 | Lombardi ........... H04M 1/0256 |
| 2017/0084286 A1 | 3/2017 | Kim et al. |
| 2017/0264792 A1 | 9/2017 | Lee et al. |
| 2018/0174597 A1 | 6/2018 | Lee et al. |
| 2019/0122687 A1 | 4/2019 | Kim et al. |
| 2020/0219525 A1 | 7/2020 | Moon et al. |
| 2020/0351605 A1 | 11/2020 | Park et al. |

FOREIGN PATENT DOCUMENTS

| | | |
|---|---|---|
| KR | 20-1993-0005862 U | 3/1993 |
| KR | 10-2005-0015903 A | 2/2005 |
| KR | 10-1529714 B1 | 6/2015 |
| KR | 10-2017-0062853 B | 6/2017 |
| KR | 10-2017-0106862 A | 9/2017 |
| KR | 10-2019-0056060 A | 5/2019 |
| KR | 10-2019-0056104 A | 5/2019 |
| KR | 10-2020-0085030 A | 7/2020 |
| WO | 2017/011403 A1 | 1/2017 |

* cited by examiner

ELECTRONIC DEVICE FOR AUDIO INPUT AND METHOD FOR OPERATING THE SAME

CROSS-REFERENCE TO RELATED APPLICATION(S)

This application is a continuation application, claiming priority under § 365(c), of an International application No. PCT/KR2021/019245, filed on Dec. 17, 2021, which is based on and claims the benefit of a Korean patent application number 10-2021-0032791, filed on Mar. 12, 2021, in the Korean Intellectual Property Office, the disclosures of which is incorporated by reference herein in its entirety.

TECHNICAL FIELD

Certain embodiments of the instant disclosure relate to an electronic device for audio input and a method for operating the same.

BACKGROUND ART

Electronic devices have advanced to provide more diversified services and functions. Development continues on a variety of applications executable on such electronic devices, to meet diverse user demand and further increase the utility of electronic devices. Among such applications, camera applications are used to capture a imagery, such as video, still images, or animations, using a camera installed in a portable electronic device.

The electronic device may execute the camera application to capture a video, and provide a variety of related functions when capturing the video. For example, the electronic device may capture audio signals through a microphone while capturing the video. Subsequently, the captured multimedia video, as captured through the camera and the microphone, may be utilized in or with a variety of other functions or applications, such as video conferencing, video calls, video production, or video editing.

Insofar as users often seek out even higher, enhanced sound quality for videography through an electronic device, users often incorporate usage of expensive external microphones, including both wired and wireless microphones which have superior sound capture compared to the microphone of the electronic device. Wireless microphones in particular eliminate the inconvenience caused by utilization of wired connections. In response to this continuation in consumer demand, manufacturers continue to develop wireless and wired external microphones, that may be used for both video and audio recording.

DISCLOSURE

Technical Problem

When the electronic device captures media, such as video or audio, the electronic device may select either an external microphone or an internal microphone as the audio input device to use for recording (e.g., a recording device). Generally, the selection of a recording device is executed prior to the initiation of video capture. In most cases, the recording device is not changed while capture is in progress.

However, for external microphones, a potential problem arises with disruptions in the connection to the electronic device. For example, a wired external microphone may suffer an unexpected disconnection of the cable connection during video recording. Likewise, a wireless external microphone may experience disconnection due to a network problem. In other cases, an external microphone may be connected during video capture with the internal microphone, and unexpectedly the electronic device may force a switch in active recording device. When the recording device is so forcibly switched, even though the video capture is uninterrupted, audio capture may be disrupted resulting in recording of silence while the switch is executed internally by the electronic device. This results in an discrepancy between the video signal and the audio signal, which may be undesirable to users.

Technical Solution

According to an embodiment, an electronic device may include an internal microphone, a communication module, and at least one processor operatively connected with the internal microphone and the communication module, wherein the at least one processor is configured to: receive, through the communication module, a first audio signal input through an external microphone included in an external electronic device communicatively connected to the electronic device, activate the internal microphone in response to detecting a device switch event switching from the external microphone to the internal microphone while receiving the first audio signal, receive a second audio signal input through the internal microphone, synchronize and mix the first audio signal and the second audio signal during a designated first time period, and deactivate the external microphone upon lapse of the designated first time period.

According to an embodiment, a method of operation in an electronic device may include: receiving, through a communication module, a first audio signal input through an external microphone included in an external electronic device communicatively coupled to the electronic device, activating an internal microphone in response to detecting a device switch event switching from the external microphone to the internal microphone while receiving the first audio signal, receiving a second audio signal input through the internal microphone, synchronizing and mixing, via at least one processor, the first audio signal and the second audio signal during a designated first time period, and deactivating the external microphone upon detecting lapse of the designated time period.

DETAILED DESCRIPTION

Figure 1:
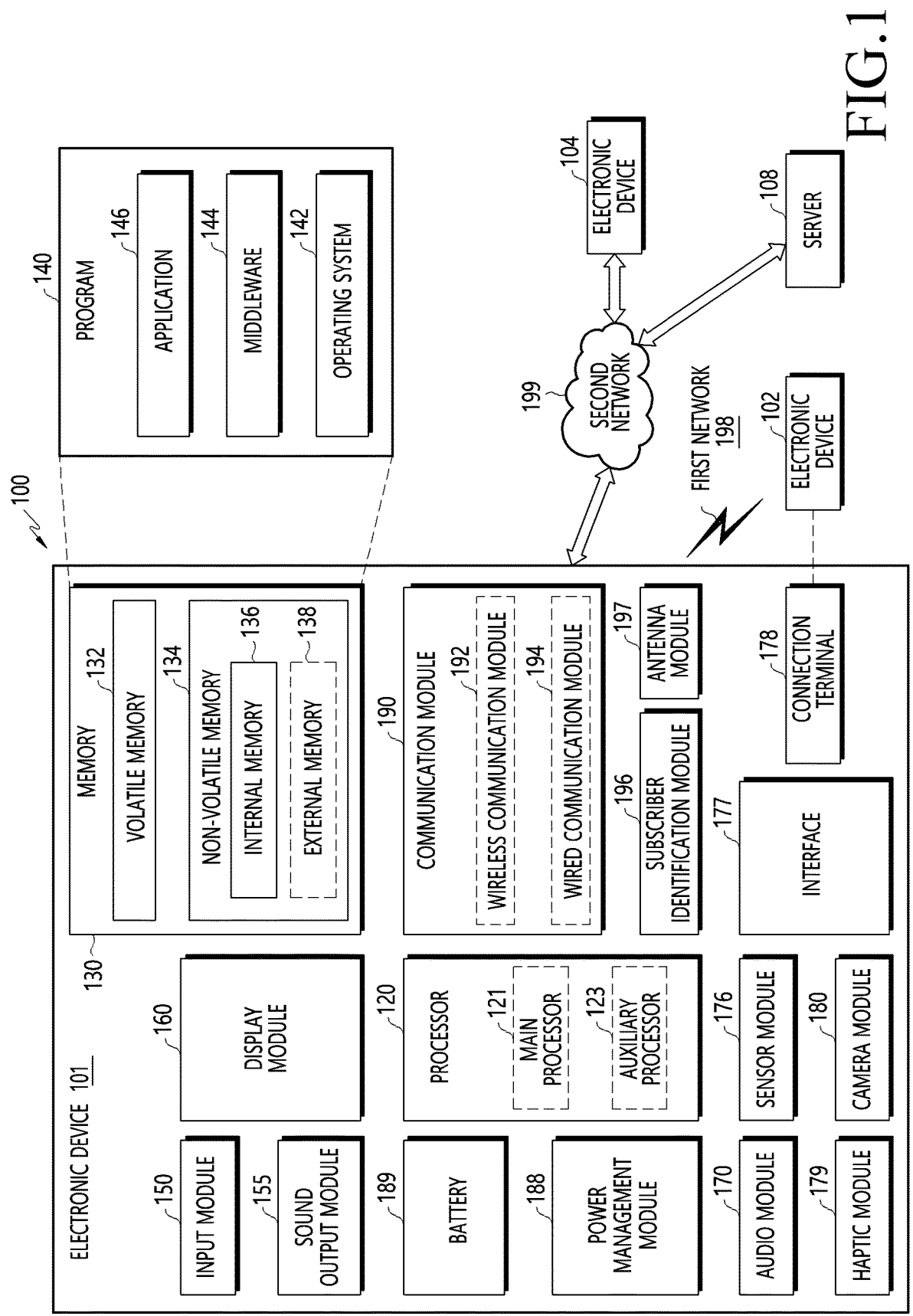
FIG. 1 is a block diagram illustrating an electronic device in a network environment according to various embodiments.

Hereinafter, certain embodiments of the disclosure are described with reference to the accompanying drawings. When determined to make the subject matter of certain embodiments of the disclosure unclear, the detailed description of the relevant known art or functions may be skipped. The terms described below are defined considering the functions in embodiments of the present disclosure and may be replaced with other terms according to the intention or practice of the user or operator. Therefore, the terms should be defined based on the overall disclosure.

The terms as used herein are provided merely to describe some embodiments thereof, but not to limit certain embodiments of the disclosure. The terms as used herein are provided merely to describe some embodiments thereof, but not to limit the other embodiments of the present disclosure. Unless otherwise defined, all terms including technical and scientific terms used herein have the same meaning as commonly understood by one of ordinary skill in the art to which the embodiments of the disclosure pertain and should not be interpreted as overly broad or narrow. As used herein, terms wrong or inappropriate for representing the disclosure may be replaced with and understood as more proper ones to represent the disclosure by one of ordinary skill in the art. General terms as used herein should be interpreted in the context of the specification or as defined in dictionaries.

As used herein, the singular forms "a," "an," and "the" are intended to include the plural forms as well, unless the context clearly indicates otherwise. As used herein, the term "comprise" or "include" should not be interpreted as necessarily including all of several components or operations set forth herein but should rather be interpreted as omitting some components or operations or adding more components or operations.

As used herein, the terms "first" and "second" may be used to describe various components, but the components should not be limited by the terms. The terms are used only to distinguish one component from another. For example, a first component may be denoted a second component, and vice versa without departing from the present disclosure.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

Hereinafter, example embodiments of the inventive concept will be described in detail with reference to the accompanying drawings. The same reference denotations may be used to refer to the same or substantially the same elements throughout the specification and the drawings. No duplicate description of the same elements is given herein. When determined to make the subject matter of the disclosure unclear, the detailed description of the known art or functions may be skipped. The accompanying drawings are provided for an easier understanding of the disclosure should not be limited thereby. It should be interpreted that the disclosure may encompass all other changes, equivalents, or replacements of those shown in the drawings.

Hereinafter, in certain embodiments of the disclosure, a terminal is described, but the terminal may also be referred to as an electronic device, mobile station, mobile equipment (ME), user equipment (UE), user terminal (UT), subscriber station (SS), wireless device, handheld device, or access terminal (AT). Alternatively, in certain embodiments, the UE may be, e.g., a device having communication functionality, such as a mobile phone, a personal digital assistant (PDA), a smart phone, a wireless modem, or a laptop computer.

Alternatively, in describing certain embodiments of the disclosure in detail, a reference will be made to standards provided by the institute of electrical and electronics engineers (IEEE) and Wi-Fi alliance (WFA), which are radio access standardization organizations. However, the subject matter of the disclosure is applicable to other communication systems having a similar technical background with slight modifications made thereto without significantly departing from the disclosure, which is possible by one of ordinary skill in the art to which the disclosure pertains.

FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from an external environment (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from other outside devices (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to certain embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
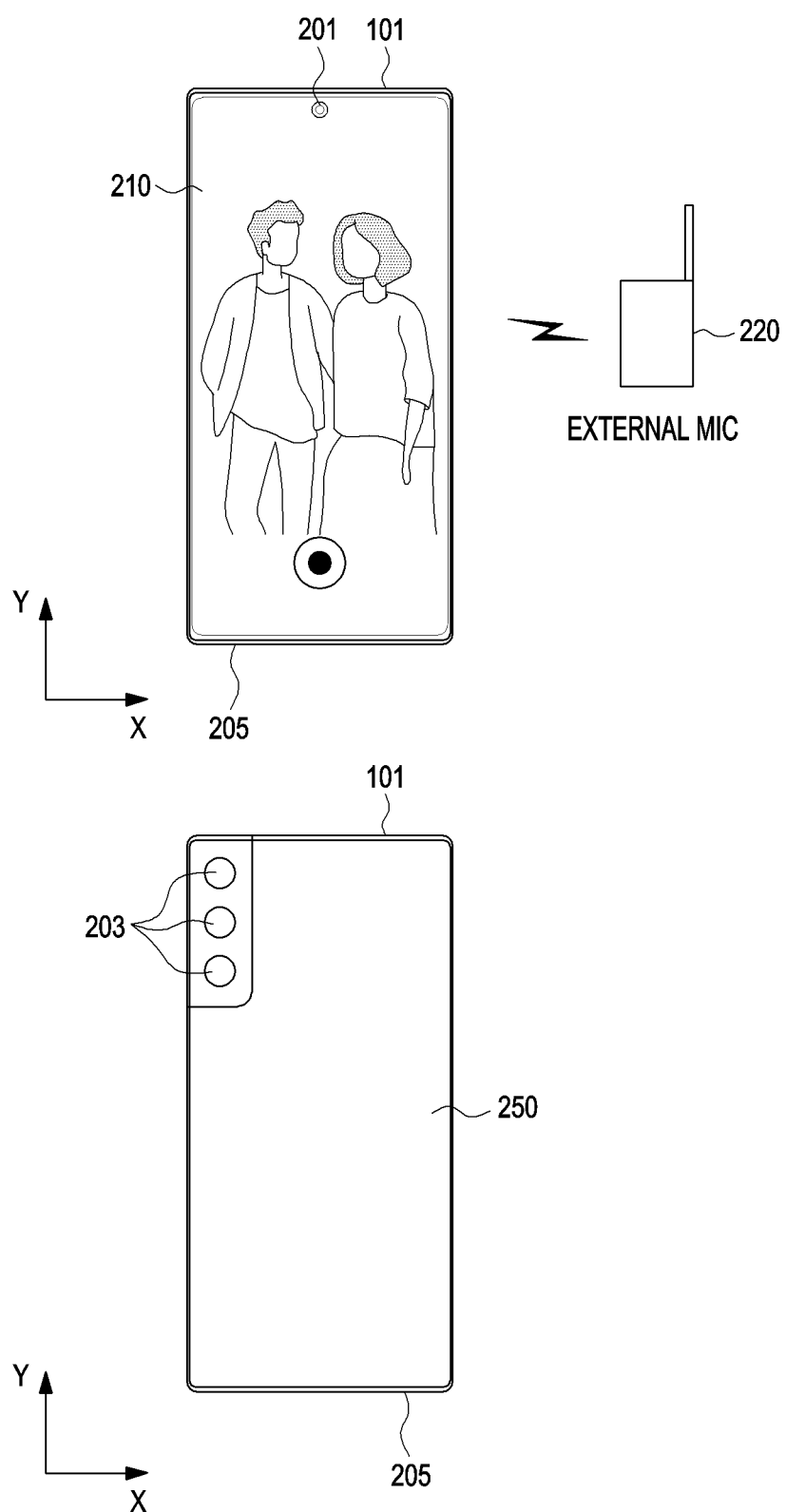
FIG. 2 is a view illustrating an example configuration of an electronic device according to an embodiment.

FIG. 2 is a view illustrating an example configuration of an electronic device according to an embodiment.

Referring to FIG. 2, an electronic device 101 may include a display module 160 visually exposed to the outside on a first surface (e.g., a front surface) 210 of a housing and a camera module 180 disposed on a second surface $_{[RH1]}$250 of the housing (e.g., at least one front camera 201 disposed in a portion of the first surface 210 and at least one rear camera 203 disposed on the second surface 250). The electronic device 101 may include an internal microphone 205 disposed on a third surface of the housing (e.g., a lower side surface with respect to the x axis). In an embodiment, the internal microphone 205 may include one or more microphone elements. For example, the internal microphone 205 may include three microphone elements each capable of receiving three-channel audio data. The processor 120 according to an embodiment may be electrically connected with the memory 130, the display module 160, the camera module 180, and the internal microphone 205.

When a recording application (e.g., a camera application) for video recording is executed, the processor 120 of the electronic device 101 according to an embodiment may activate the camera module 180. The processor 120 may identify a video recording request, e.g., such as an input selection of an execution icon (e.g., an object, a graphic element, a menu, a button, or a shortcut image) representing the recording application displayed on the home screen (not shown) of the display module 160, depression of a designated button input, or detection a designated gesture, after which the recording application is executed.

According to an embodiment, when the recording application is executed, the processor 120 of the electronic device 101 may control the camera module 180 to activate at least one camera 201 or 203 to initiate video recording and control the display module 160 to display a video recording screen. In an embodiment, the processor 120 may activate at least one internal microphone 205 included in the input module 150 to receive an audio signal corresponding to the sound introduced from the user, the subject, or surroundings of the subject upon video recording.

In an embodiment, the processor 120 may establish a communication connection over wireless communication, with an external electronic device (e.g., the external electronic device 102) including at least one external microphone 220 (e.g., a Bluetooth (BT) mic), and transmit a request to the external electronic device 102 to activate the external microphone 220 through the communication connection. Here, the wireless communication may be, e.g., communication by Bluetooth (BT), Bluetooth low energy (BLE), or Wi-Fi. In an embodiment, the processor 120 may directly control the wireless communication module 192 to activate the external microphone 220 or may control the wireless communication module 192 through the audio module 170 to activate the external microphone 220. In an embodiment, the external microphone 220 may be a wired microphone (e.g., a USB external microphone) that communicates with the processor 120 through the connecting terminal 178. The processor 120 may activate the external microphone 220 through the connecting terminal 178 or may instruct the audio module 170 to activate the external microphone 220 through the connecting terminal 178 and receive an audio signal from the subject or surroundings of the subject through the external microphone 220.

The audio signal may be received through at least one of the internal microphone 205 and the external microphone 220, transferred to the processor 120 through the audio module 170, and then synchronized and merged with the video signal collected through the camera 201 or 203 by the recording application running on the processor 120.

In an embodiment, when the external microphone 220 includes a USB external microphone and/or a BT wireless microphone, a recording device for obtaining an audio signal corresponding to the sound introduced from an external environment may be implemented using the following combinations:

Combination 1: internal microphone alone;
Combination 2: USB external microphone alone;
Combination 3: BT wireless microphone alone;
Combination 4: Combination of the internal microphone and the USB external microphone;
Combination 5: Combination of the internal microphone and the BT wireless microphone;
Combination 6: Combination of the USB external microphone and the BT wireless microphone; and
Combination 7: Combination of the internal microphone, the USB external microphone, and the BT wireless microphone.

While a video is recorded by the recording application using the external microphone 220, the recording device may be unexpectedly switched from the external microphone 220 to the internal microphone 205, due to an interruption in communication connection between the electronic device 101 and the external microphone 220 or other issues. In an embodiment, the processor 120 may recognize that the connection state between the electronic device 101 and the external microphone 220 is disrupted, and determine to switch the recording device. For example, the user may recognize that the quality of the audio signal input through the external microphone 220 is poor, and generate an input requesting a switch from the recording device to the electronic device 101.

As another example, while video recording is executed by the recording application using the internal microphone 205, the recording device may be switched from the internal microphone 205 to the external microphone 220 upon new detection of a communication connection between the electronic device 101 and the external microphone 220 (or for other reasons). In an embodiment, when the processor 120 recognizes communicative connection of the external microphone 220 to the electronic device 101 or detects a positive change in the connection state between the electronic device 101 and the external microphone 220, the processor 120 may determine to switch the active recording device. In an embodiment, the user may recognize that the quality of the audio signal input through the internal microphone 205 is poor and generate an input requesting a switch from the recording device to the electronic device 101.

When the recording device is switched, the video signal may be continuously recorded through the camera 201 or 203 without interruption. However, recording of the audio signal may be interrupted during the switch by the electronic device 101. In an embodiment, the processor 120 may insert silent audio data (e.g., silence data) into the audio signal recorded during the time in which the recording device is being switched.

Figure 3:
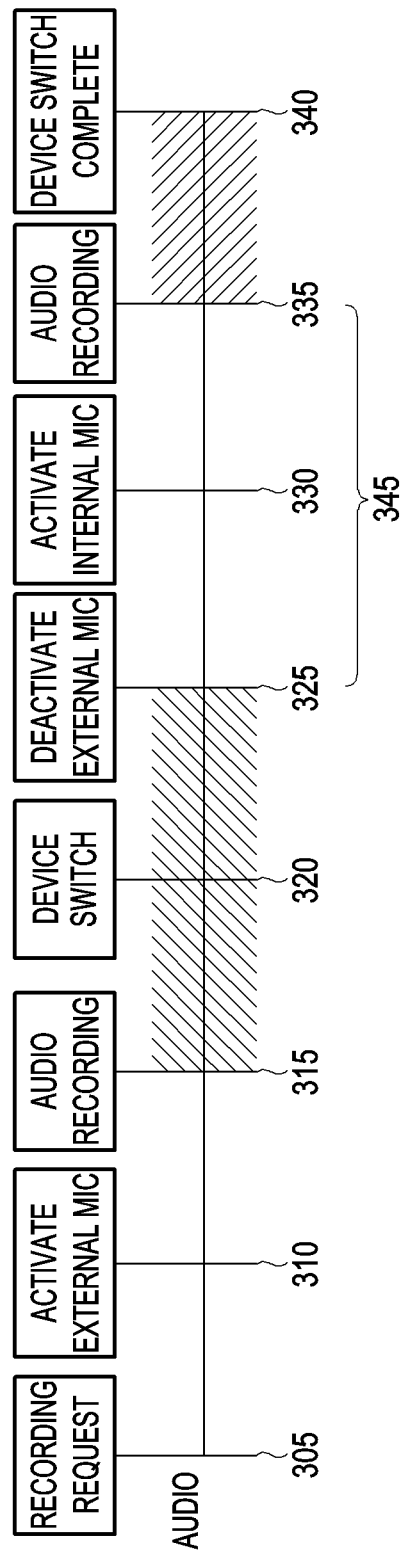
FIG. 3 is a timing diagram illustrating processing of audio signals due to insertion of silence data when a recording device is switched.

FIG. 3 is a timing diagram illustrating the processing of audio signals including the insertion of silence data during a switch in the active recording device. Although operations performed when the recording device is switched from the external microphone 220 to the internal microphone 205 are described as an example, the opposite case may also be operated in a similar manner.

Referring to FIG. 3, at a time 305, the processor 120 may detect input of a recording request (e.g., a request for executing the camera application) by, e.g., a user input or another means (e.g., detecting the expiration of a timer or a recording event). In response to the recording request, the processor 120 may execute the recording application while activating at least one camera and at least one microphone (MIC) included in the camera module 180. In an embodiment, according to detecting a connection of the external microphone 220 to the electronic device 101, the processor 120 may activate the external microphone 220 at a time 310.

At a time 315, the external microphone 220 may initiate collection of audio signals, and the processor 120 may merge the collected audio signal with the video signal collected through the camera and store the combination as a multimedia video in memory.

At a time 320, the processor 120 may detect device re-routing for switching the recording device. The recording device switch may be detected by the processor 120, e.g., upon a malfunction of the external microphone 220, or disruption in communicative connection with the external microphone 220 (which may include, e.g., disconnection). In an embodiment, the processor 120 may determine to switch the recording device according to detection of a user input requesting switching of the recording device. At a time 325, the processor 120 may deactivate the external microphone 220 to process the recording device switch. As the external microphone 220 is deactivated, the audio signal may not be received any longer by the electronic device 101.

Thereafter, at a time 330, the processor 120 may activate the internal microphone 205, and the internal microphone 205 may initiate processing for activation and, at a time 335, begin recording of an audio signal. At a time 335, the processor 120 may merge and record the audio signal collected by the internal microphone 205 and the video signal. At a time 340, the processor 120 may identify that the audio signal is normally collected by the internal microphone 205 and determine that the recording device switch has been completed.

In the time period 345 from the time 325 when the external microphone 220 is deactivated to the time 335 when the internal microphone 205 starts to receive the audio signal, the processor 120 may not receive any audio signals, so that the processor 120 may insert silence data during the time period 345. The processor 120 may insert the silence data between the audio signal before the time 325 and the audio signal before the time 335. The audio signal including the silence data may be merged with the video signal in the period by the recording application executed on the processor 120.

There may be two methods for identifying the time period 345 for adding the silence data as follows.

In a first method, the processor 120 may set a frame count for video and audio (hereinafter, referred to as video/audio) data including the video signal and the audio signal. The vehicle may set a frame count that is increased by one for each frame in the video/audio data input during video recording, identify a first frame count at the time 325, which is before the recording device switch, and a second frame count at the time 335, which is after the recording device switch, and insert silence data to the video/audio data between the first frame count and the second frame count.

In a second method, the processor 120 may record the time stamp at the time 325 when the external microphone 220 is deactivated, record the time stamp at the time 335 when the audio signal recording begins by the internal microphone 205, and measure the time between the times 325 and 335 using the time stamps. At the time 340 when the recording device switch is completed, the processor 120 may generate the audio signal to which as much silence data as measured has been inserted and merge the silence data-containing audio signal with the video signal.

Figure 4:
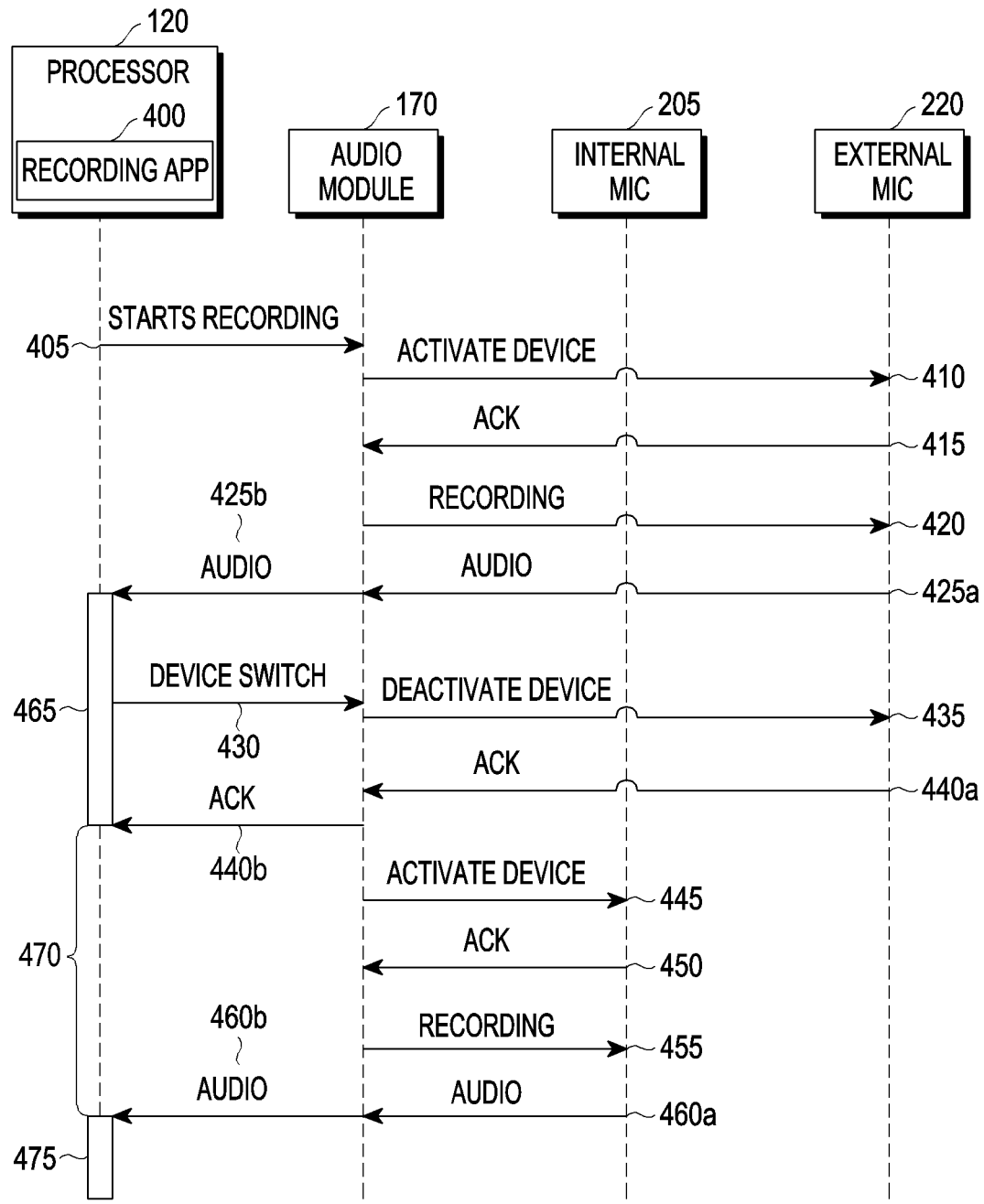
FIG. 4 is a signal flow diagram illustrating processing of audio signals due to insertion of silence data.

FIG. 4 is a signal flow diagram illustrating processing of audio signals due to insertion of silence data.

Referring to FIG. 4, in operation 405, the processor 120 may transfer a recording start signal to the audio module 170 when the recording application 400 is executed. In an embodiment, the audio module 170 may be implemented using an audio framework software module included in the processor 120, and the recording start signal may be transferred from the recording application 400 to the audio framework software module. In response to the recording start signal, in operation 410, the audio module 170 may transmit a device activation signal to the external microphone 220 and, in operation 415, the audio module 170 may receive a response (ACK) signal indicating that the external microphone 220 has been successfully activated in response to the device activation signal.

In an embodiment, the audio module 170 may detect connection of the external microphone 220 through the wireless communication module 192 or the connecting terminal 178 and transmit the device activation signal to the external microphone 220. In an embodiment, the processor 120 may detect connection of the external microphone 220 through the wireless communication module 192 or connecting terminal 178 and include information, for instructing the audio module 170 to transmit the device activation signal to the external microphone 220, in the recording start signal.

Although not shown, in an embodiment, if the recording device is switched from the internal microphone 205 to the external microphone 220, the audio module 170 may detect non-connection of the external microphone 220 through the wireless communication module 192 or the connecting terminal 178, and transmit the device activation signal to the internal microphone 205. In an embodiment, the processor 120 may detect non-connection of the external microphone 220 through the wireless communication module 192 or the connecting terminal 178 and include information, for instructing the audio module 170 to transmit the device activation signal to the internal microphone 205, in the recording start signal.

In operation 420, the audio module 170 may transmit a recording signal to the external microphone 220, in operation 425*a*, receive the audio signal including the audio data collected by the external microphone 220, and in operation 425*b*, transmit the audio signal to the processor 120. In operation 465, the processor 120 may record the audio signal. In an embodiment, in operation 465, the processor 120 may merge the audio signal with the video signal received through the camera and store it or output it on the screen.

In operation 430, the processor 120 may determine to switch the recording device and transmit a device switch signal to the audio module 170. In an embodiment, the recording device switch may be determined when the processor 120, for example, detects a poor communication state of the external microphone 220 through the wireless communication module 192 or the connecting terminal 178 (e.g., when a signal strength is below a predetermined threshold). In an embodiment, the recording device switch may be determined as the processor 120 receives a user input requesting to switch the microphone.

In operation 435, the audio module 170 may transmit a device deactivation signal to the external microphone 220 and, in operation 440*a*, receive a response signal indicating that device deactivation has been completed. In operation 445, the audio module 170 may transmit the device activation signal to the internal microphone 205 and, in operation 450, receive a response signal indicating that the internal microphone 205 has been successfully activated. In operation 455, the audio module 170 may transmit a recording signal to the internal microphone 205, in operation 460*a*, receive the audio signal including the audio data collected by the internal microphone 205, and in operation 460*b*, transmit the audio signal to the processor 120.

When receiving the response signal corresponding to the device deactivation signal from the external microphone 220 in operation 440*a*, the audio module 170 may transfer, to the processor 120, a signal indicating that the external microphone 220 has been deactivated in operation 440*b*. In operation 470, the processor 120 may generate an audio signal including silence data from the time of operation 440*b* in which the deactivation of the external microphone 220 is recognized to the time of operation 460*b* in which the audio signal collected through the internal microphone 205 is received. The generated audio signal may be used to be merged with the video signal. After the recording device switch is completed, in operation 475, the processor 120 may stop generation of the silence data-containing audio signal and merge the audio signal collected through the internal microphone 205 with the video signal.

Hereinafter, certain embodiments for maintaining the continuity of the audio signal while the recording device is switched is described.

Figure 5:
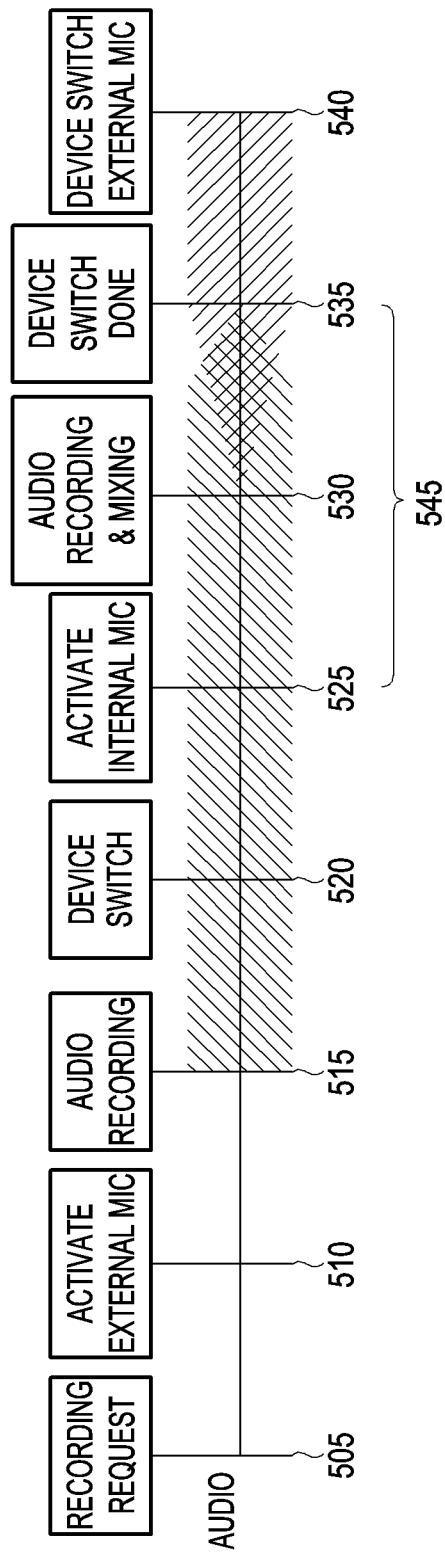
FIG. 5 is a timing diagram illustrating processing of audio signals when a recording device is switched according to an embodiment.

FIG. 5 is a timing diagram illustrating processing of audio signals when a recording device is switched according to an embodiment. Although operations performed when the recording device is switched from the external microphone 220 to the internal microphone 205 are described, the opposite case may also be operated in a similar manner.

Referring to FIG. 5, at a time 505, the processor 120 of the electronic device 101 may detect a recording request by, e.g., a user input or another means. In response to the recording request, the processor 120 may execute the recording application while activating at least one camera and at least one microphone included in the camera module 180. In an embodiment, according to detection of connection of the external microphone 220 to the electronic device 101, the processor 120 may activate the external microphone 220 at a time 510. At a time 515, the external microphone 220 may begin receive of an audio signal, and the processor 120 may merge the received audio signal with the video signal received through the camera and record it to memory.

At a time 520, the processor 120 may detect device re-routing for switching the recording device. The recording device switch may be detected by the processor 120, e.g., due to a malfunction of the external microphone 220, or a connection failure between the electronic device 101 and the external microphone 220, etc. In an embodiment, the processor 120 may determine to switch the recording device according to detection of a user input to request for switching the recording device. At a time 525, the processor 120 may activate the internal microphone 205 to process the recording device switch. The external microphone 220 however is still active here (as per 530). Thus, the audio signal from the still-active external microphone 220 and the audio signal from the activated internal microphone 205 (as per 530) may both be received by the electronic device 101. At a time point 530, the processor 120 may begin mixing the audio signal from the internal microphone 205 and the audio signal from the internal microphone 205. At a time 535, until activation of the internal microphone 205 is normally completed, the processor 120 may continue to perform mixing processing on the audio signals. Thereafter, at a time 540, the processor 120 may deactivate the external microphone 220, thereby completing the switching process. Then, the mixing process may be finished.

The processor 120 may mix the audio signal from the internal microphone 205 and the audio signal from the external microphone 220 from the time 525 when the internal microphone 205 is activated to the time 540 when the external microphone 220 is deactivated and record the mixed audio signals. As such, the processor 120 may maintain the input of the audio signal while the recording device switch is performed, preventing audio loss in recording.

Figure 6:
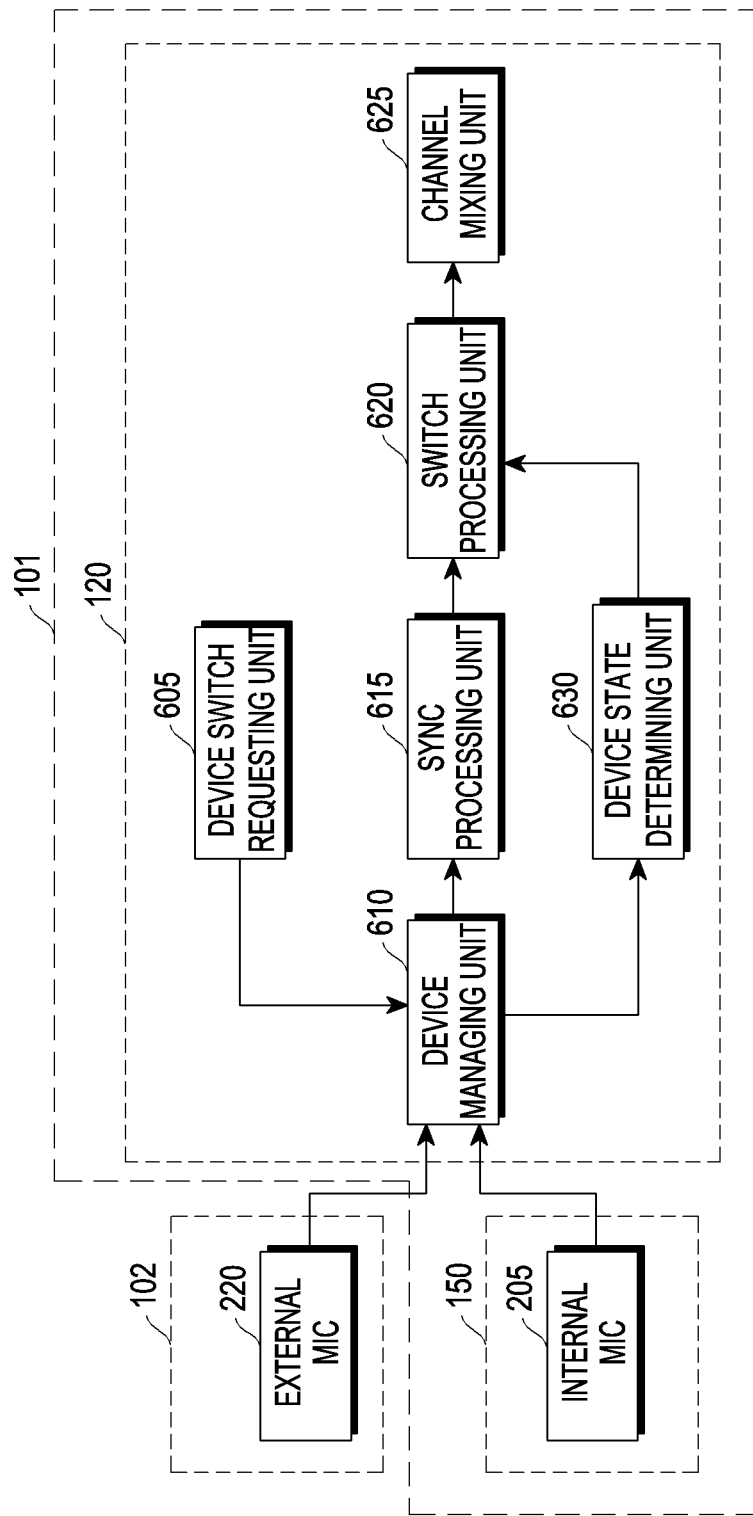
FIG. 6 is a block diagram illustrating a configuration of an electronic device that processes audio signals when a recording device is switched according to certain embodiments.

FIG. 6 is a block diagram illustrating a configuration of an electronic device 101 that processes audio signals when a recording device is switched according to certain embodiments.

Referring to FIG. 6, an electronic device 101 may include a processor 120 and an input module 150 including at least one internal microphone 205. The electronic device 101 may establish a wired communication-based or wireless communication-based communication connection with an external electronic device 102 including at least one external microphone 220 and may communication a control signal (e.g., an activation signal or a deactivation signal) for the external microphone 220 through the communication connection or receive a first audio signal from the external microphone 220.

In an embodiment, the processor 120 may include a device switch requesting unit 605, a device managing unit 610, a sync (synchronizing) processing unit 615, a switch processing unit 620, a channel mixing unit 625, and a device state determining unit 630. In an embodiment, at least some of the components included in the processor 120 may be implemented as software modules. In an embodiment, the device switch requesting unit 605 may be included in a recording application executed by the processor 120. In an embodiment, the device managing unit 610, the sync processing unit 615, the switch processing unit 620, the channel mixing unit 625, and the device state determining unit 630 may be included in audio framework implemented by the processor 120. In an embodiment, at least one of the device managing unit 610, the sync processing unit 615, the switch processing unit 620, the channel mixing unit 625, and the device state determining unit 630 may be included in the audio module 170.

In an embodiment, operations performed when the recording device is switched from the external microphone 220 to the internal microphone 205 are described below.

In an embodiment, before the recording device switch, the external microphone 220 may be active, and the internal microphone 205 may be inactive. The first audio signal collected by the external microphone 220 may be input to the device managing unit 610 of the processor 120. If the device switch requesting unit 605 determines to switch the recording device and notifies the device managing unit 610 of it, the device managing unit 610 may transmit an activation signal to the internal microphone 205. In response to the activation signal, the internal microphone 205 may be activated, and the second audio signal collected by the internal microphone 205 may start to be input to the device managing unit 610 of the processor 120. In an embodiment, the internal microphone 205 and the external microphone 220 both may be active. Before the recording device switch, the device managing unit 610 may select and output the first audio signal from the external microphone 220, of the active internal microphone 205 and the active external microphone 220. If notified of the recording device switch, the device managing unit 610 may output both the first audio signal from the external microphone 220 and the second audio signal from the internal microphone 205.

In an embodiment, since there is a time difference between the second audio signal input from the internal microphone 205 and the first audio signal input from the external microphone 220, the first and second audio signals may be synchronized. The sync processing unit 615 may synchronize them by compensating for the time difference between the second audio signal input from the internal microphone 205 and the first audio signal input from the external microphone 220. In an embodiment, the sync processing unit 615 may synchronize the first audio signal and the second audio signal by delaying the second audio signal input from the internal microphone 205 by a designated delay value.

The device state determining unit 630 may receive, from the device managing unit 610, a signal indicating that the internal microphone 205 is active and transfer the signal to the switch processing unit 620. In response to reception of the signal, the switch processing unit 620 cross-fades the first audio signal and the delayed second audio signal transferred from the sync processing unit 615. In an embodiment, the switch processing unit 620 may correct at least one of the first audio signal and the second audio signal to reduce the volume differential between the first audio signal of the external microphone 220 and the delayed second audio signal of the internal microphone 205 using root means square (RMS) dynamic range control (DRC) so as to smoothly process the switch from the external microphone 220 to the internal microphone 205.

In an embodiment, the switch processing unit 620 may cross-fade the first audio signal and the delayed second audio signal during a designated time period (e.g., a designated number of, one or more, frames). The cross-fading may include an operation of gradually increasing the volume of the delayed second audio signal through fade-in processing and an operation of gradually decreasing the volume of the first audio signal through fade-out processing during the designated time period. In an embodiment, the length of the designated time period may be previously determined by the manufacturer of the electronic device 101 or may be determined by measurement in the processor 120.

The channel mixing unit 625 may mix the fade-in-processed second audio signal and the fade-out-processed first audio signal, generating mixed audio signals. In an embodiment, the mixed audio signals may be recorded or merged with the video signal recorded by the camera.

In an embodiment, operations performed when the recording device is switched from the internal microphone 205 to the external microphone 220 are described below.

Before the recording device switch, the internal microphone 205 may be active, and the external microphone 220 may be inactive. While a third audio signal obtained by the internal microphone 205 is received, the device switch requesting unit 605 may determine to switch the recording device and notify the device managing unit 610 of it. In response to the notification, the device managing unit 610 may transmit an activation signal to the external microphone 220. In response to the activation signal, the external microphone 220 may be activated, and the fourth audio signal collected by the external microphone 220 may start to be input to the device managing unit 610 of the processor 120.

In an embodiment, the sync processing unit 615 may synchronize them by compensating for the time difference between the third audio signal input from the internal microphone 205 and the fourth audio signal input from the external microphone 220. In an embodiment, the sync processing unit 615 may delay the third audio signal by a designated delay value.

The switch processing unit 620 may cross-fade the delayed third audio signal and the fourth audio signal transferred from the sync processing unit 615 during a designated time period. In an embodiment, the delayed third audio signal may be fade-out-processed, and the fourth audio signal may be fade-in-processed. The channel mixing unit 625 may mix the fade-in-processed second audio signal and the fade-out-processed first audio signal, generating mixed audio signals. In an embodiment, the mixed audio signals may be recorded or merged with the video signal recorded by the camera. If the designated time period terminates, the device managing unit 610 may transmit a deactivation signal to the internal microphone 205.

According to an embodiment, an electronic device 101 may include an internal microphone 205, a communication module 190, and at least one processor 120 operatively connected with the internal microphone and the communication module. The at least one processor may be configured to receive, through the communication module, a first audio signal input through an external microphone 220 included in an external electronic device 102 communicatively connected to the electronic device, activate the internal microphone in response detecting a device switch event switching from the external microphone to the internal microphone while receiving the first audio signal, receive a second audio signal input through the internal microphone, synchronize and mix the first audio signal and the second audio signal during a designated first time period, and deactivate the external microphone upon detecting lapse of the designated first time period.

In an embodiment, the at least one processor may be configured to delay the second audio signal by a designated delay value, wherein mixing the first audio signal and the delayed second audio signal includes applying cross-fading during the designated first time period.

In an embodiment, the at least one processor may be configured to correct at least one of the first audio signal and the delayed second audio signal to at least reduce a volume differential between the first audio signal and the delayed second audio signal before mixing the first audio signal and the delayed second audio signal.

In an embodiment, correcting at least one of the delayed second audio signal and the first audio signal further includes using root mean square (RMS) dynamic range compression (DRC).

In an embodiment, the at least one processor may be configured to merge the mixed first and second audio signals with a first video signal corresponding to the designated first time period.

In an embodiment, the at least one processor may be configured to store a third audio signal received through the external microphone in a recovery buffer, activate the internal microphone in response to detection of disconnection of the external electronic device from the electronic device, after detecting the disconnection, retrieve the third audio signal from the recovery buffer, mix a fourth audio signal input through the internal microphone with the third audio signal obtained from the recovery buffer during a designated second time period, and merge the mixed fourth and third audio signals with a second video signal corresponding to the second time period.

In an embodiment, the at least one processor may be configured to delay the fourth audio signal by a designated delay value, correct at least one of the third audio signal and the delayed fourth audio signal to at least reduce a volume differential between the third audio signal and the delayed fourth audio signal, mix the corrected third audio signal and fourth audio signal through cross-fading during the second time period, and terminate output of the third audio signal from the recovery buffer upon lapse of the designated second time period.

In an embodiment, the at least one processor may be configured to obtain a fifth audio signal received through the internal microphone, transmit a signal to the external electronic device to activate the external microphone while obtaining the fifth audio signal, obtain a sixth audio signal received through the external microphone, synchronize the fifth audio signal and the sixth audio signal, mix the synchronized fifth audio signal and sixth audio signal during a designated second time period, and deactivate the internal microphone upon lapse of the designated second time period.

In an embodiment, the at least one processor may be configured to delay the fifth audio signal by a designated delay value, correct at least one of the delayed fifth audio signal and the sixth audio signal to at least reduce a volume differential between the delayed fifth audio signal and the sixth audio signal, and mix the corrected fifth audio signal and sixth audio signal using at least cross-fading during the second time period.

In an embodiment, the at least one processor may be configured to store a seventh audio signal received through the internal microphone in a recovery buffer, transmit a signal to the external electronic device to activate the external microphone, retrieve the seventh audio signal from the recovery buffer, correct at least one of an eighth audio signal input through the external microphone and the seventh audio signal obtained from the recovery buffer to at least reduce a volume differential between the eighth audio signal and the seventh audio signal, mix the corrected seventh audio signal and eighth audio signal using at least cross-fading during a designated third time period, merge the mixed seventh and eighth audio signals with a second video signal corresponding to the third time period, and terminate output of the seventh audio signal from the recovery buffer upon lapse of the designated third time period.

Figure 7:
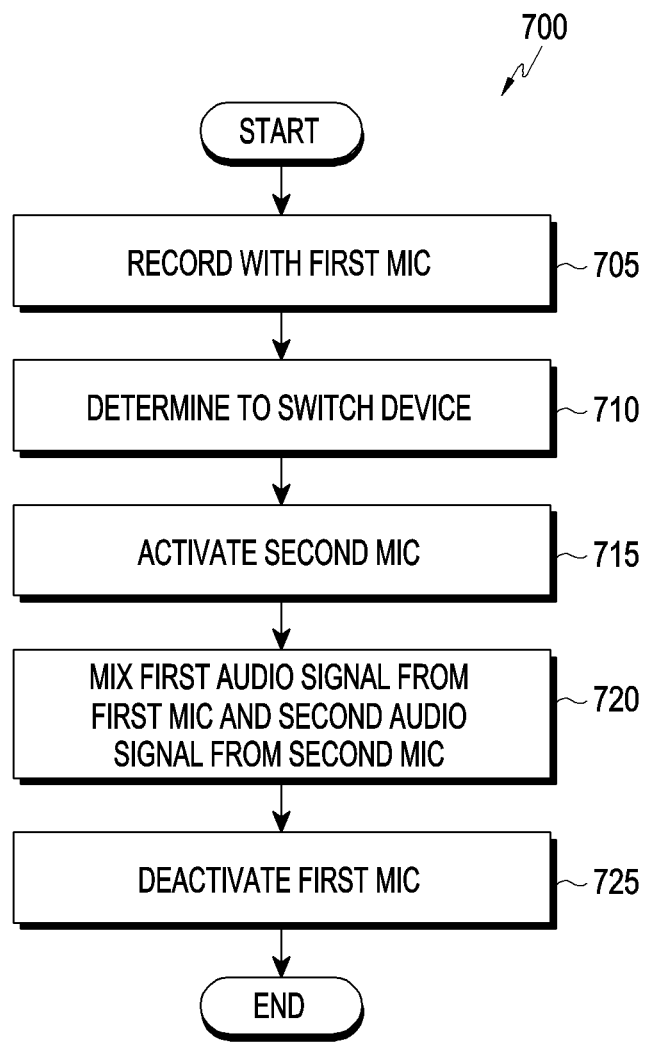
FIG. 7 is a flowchart illustrating a procedure for processing audio signals when a recording device is switched according to certain embodiments.

FIG. 7 is a flowchart illustrating a procedure 700 for processing audio signals when a recording device is switched according to certain embodiments.

Referring to FIG. 7, in operation 705, the processor 120 may record the audio signal input via an activated first microphone. In an embodiment, the first microphone may be either the internal microphone 205 included in the electronic device 101 or the external microphone 220 included in the external electronic device 102. In operation 710, the processor 120 may determine to switch the recording device from the first microphone to a second microphone. In an embodiment, the second microphone may be a microphone different from the first microphone, which may be included in the electronic device 101 or connected to the electronic device 101. For example, when the first microphone is the internal microphone 205, the second microphone may be the external microphone 220. As another example, when the first microphone is the external microphone 220, the first microphone may be the internal microphone 205.

In operation 715, while the first microphone is active, that is, while the audio signal is continuously being received through the first microphone, the processor 120 may activate the second microphone. In operation 720, the processor 120 may mix the first audio signal received from the first microphone with the second audio signal received from the second microphone during a designated time period. In an embodiment, the first audio signal may be processed with a fade-out effect before mixing, and the second audio signal may be processed to include a fade-in before mixing. In an embodiment, during the designated time period, the processor 120 may stepwise decrease the volume of the first audio signal, and stepwise increase the volume of the second audio signal. The fade-out-processed first audio signal and the fade-in-processed second audio signal may thus be mixed. In an embodiment, the processor 120 may execute the recording application including a video and, when a video signal is received through the camera during the designated time period, merge the mixed audio signals with the video signal.

In operation 725, when the designated time period lapses, the processor 120 may deactivate the first microphone, completing the switch.

Figure 8:
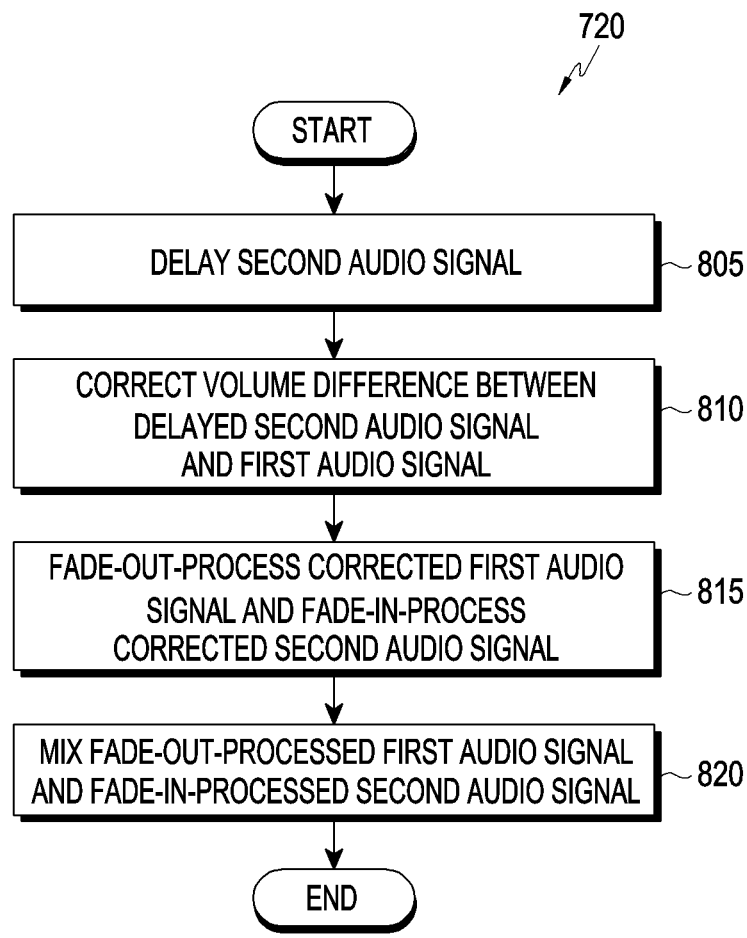
FIG. 8 is a flowchart illustrating an operation of mixing audio signals according to certain embodiments.

FIG. 8 is a flowchart illustrating an operation 720 of mixing audio signals according to certain embodiments.

Referring to FIG. 8, in operation 805, the processor 120 may receive the first audio signal and the second audio signal, and delay either the first audio signal or the second audio signal (e.g., the second audio signal from the internal microphone 205), by a designated delay value. In an embodiment, the processor 120 may delay the second audio signal by the delay value, on a frame by frame basis.

In operation 810, the processor 120 may correct the delayed second audio signal and the first audio signal to reduce a volume differential between the delayed second audio signal and the first audio signal. In an embodiment, the processor 120 may use an RMS DRC scheme for correction. The RMS DRC scheme may detect a first RMS value indicating the volume of the first audio signal, and a second RMS value indicating the volume of the delayed second audio signal. The processor 120 may compare the first RMS and the second RMS. For example, when the first RMS is larger, the processor 120 may reduce the volume of the first audio signal to be equal, or at least similar, to the volume of the delayed second audio signal using a DRC scheme. Conversely, when the second RMS is larger, the processor 120 may reduce the volume of the delayed second audio signal to be equal, or at least similar, to the volume of the first audio signal using the DRC scheme.

In operation 815, the processor 120 may process the corrected first audio signal to incorporate a fade-out effect, and process the corrected second audio signal to incorporate a fade-in effect. The fade-out-processing may include an operation of stepwise reducing the volume of the corrected first audio signal during the designated time period. The fade-in-processing may include an operation of stepwise increasing the volume of the corrected second audio signal during the designated time period.

In operation 820, the processor 120 may mix the fade-out-processed first audio signal and the fade-in-processed second audio signal during the designated time period. The mixed audio signals may be merged with the corresponding video signal and be then stored or output.

Figure 9:
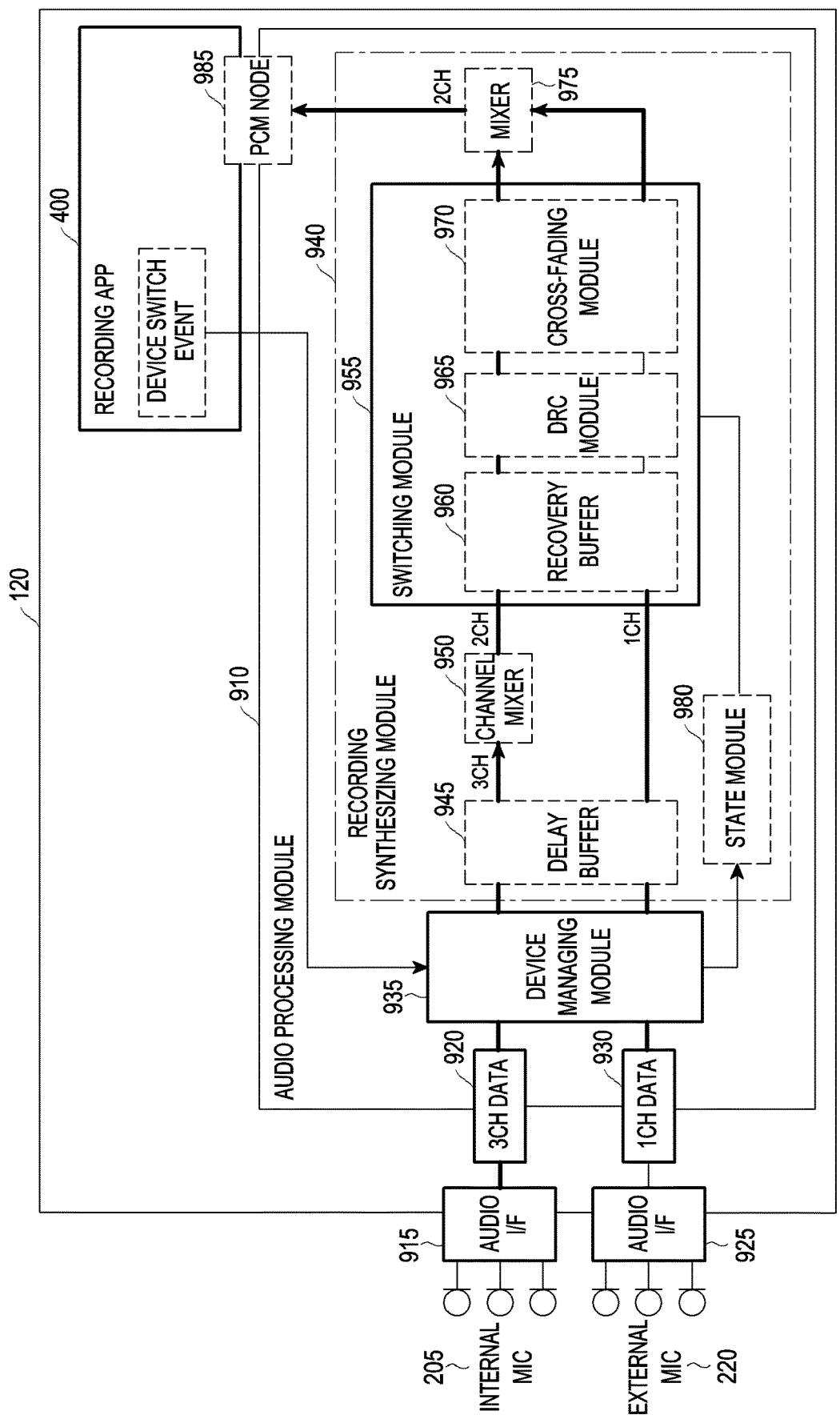
FIG. 9 is a block diagram illustrating an implementation example of a processor for processing a recording device switch according to certain embodiments.

FIG. 9 is a block diagram illustrating an implementation example of a processor 120 for processing a recording device switch according to certain embodiments.

Referring to FIG. 9, a processor 120 may include a recording application 400 and an audio processing module 910. In an embodiment, the audio processing module 910 may be implemented as audio framework software implemented as an audio hardware abstraction layer (HAL). In an embodiment, the audio processing module 910 may be implemented as the audio module 170 instead of being included in the processor 120.

The external microphone 220 may be connected to the processor 120 through an audio interface 925. The first audio signal 930 from the external microphone 220 may include one-channel audio data and be transferred through the audio interface 925 to the audio processing module 910. The internal microphone 205 may be connected to the processor 120 through an audio interface 915. The second audio signal 920 from the internal microphone 220 may include three-channel audio data and be transferred through the audio interface 915 to the audio processing module 910. The audio processing module 910 may receive at least one of the first audio signal 930 from the external microphone 220 and the second audio signal 920 from the internal microphone 205.

The audio processing module 910 may include a device managing module 935, which manages connections with the external microphone 220 and the internal microphone 205, and manages each device state, and a recording synthesizing module 940, which processes and mixes the audio signals.

In an embodiment, a device switch from the external microphone 220 to the internal microphone 205 is described.

While the external microphone 220 is active, and the first audio signal 930 is input through the external microphone 220, the recording application 400 may detect a device switch event to switch audio recording devices, and transfer the device switch event to the device managing module 935. In an embodiment, the processor 120 may receive a request for switching the recording device by the user and generate a device switch event through the recording application 400. In an embodiment, the processor 120 may determine that a recording device switch is to be executed due to an issue with connection with the external microphone 220, or other issues (described elsewhere in the disclosure), and generate a device switch event through the recording application 400.

The device managing module 935 may activate the internal microphone 205 in response to the device switch event. Thus, the external microphone 220 and the internal microphone 205 both are activated, and the first audio signal 930 from the external microphone 220 and the second audio signal 920 from the internal microphone 205 are both input to the recording synthesizing module 940 through the device managing module 935. The recording synthesizing module 940 may mix the first audio signal 930 and the second audio signal 920 during a designated time period, and transfer the mixed audio signals through a pulse code modulation (PCM) node 985 to the recording application 400. The recording application 400 may merge the mixed audio signals with the video signal, which is input through a camera (not shown) and which corresponds to the designated time period, and record the same to memory.

In an embodiment, the recording synthesizing module 940 may include a delay buffer 945, a switching module 955, and a mixer 975. Optionally, the recording synthesizing module 940 may further include a channel mixer 950 and a state module 980. The delay buffer 945 may delay either the first audio signal 930 or the second audio signal 920 input through the device managing module 935 by a designated delay value. In an embodiment, the delay buffer 945 may delay the first audio signal 930 from the external microphone 220 by a designated delay value and output a delayed first audio signal. The delay value may correspond to the input time difference between the external microphone 220 and the internal microphone 205 and may be measured by the processor 120 or previously determined by the manufacturer.

In an embodiment, the delayed first audio signal output from the delay buffer 945 may include three-channel data and may be converted into an audio signal including two-channel audio by the channel mixer 950. The audio signal from the channel mixer 950 is input to the switching module 955.

In an embodiment, the switching module 955 may include a DRC module 965 and a cross-fading module 970 and, optionally, may further include a recovery buffer 960. When the recovery buffer 960 is included, the recovery buffer 960 may store the audio signal, which is input from the channel mixer 950, and/or the audio signal, which is input via the delay buffer 945, by each designated length. Each audio signal stored in the recovery buffer 960 may be used to mix with another audio signal when an actual audio signal is not normally received due to a failure in each microphone or disconnection. The purpose of the recovery buffer 960 is described below in detail.

The DRC module 965 may receive the audio signal corresponding to the internal microphone 205 and the audio signal corresponding to the external microphone 220, which are input through the recovery buffer 960, and perform an RMS DRC operation by referencing device information about the internal microphone 205 and the external microphone 220 received from the state module 980 to thereby correct the volume difference between the audio signals and output the corrected first audio signal and the corrected second audio signal. In an embodiment, the device information may include information about the volumes of the internal microphone 205 and the external microphone 220.

The cross-fading module 970 may receive the corrected first audio signal and the corrected second audio signal from the DRC module 965 and cross-fade the corrected first audio signal and the corrected second audio signal during a designated time period. In an embodiment, the cross-fading may include fade-out-processing of the corrected first audio signal corresponding to the external microphone 220, and fade-in-processing of the corrected second audio signal corresponding to the internal microphone 205.

The mixer 975 may mix the fade-out-processed first audio signal and the fade-in-processed second audio signal received from the cross-fading module 970. The mixed audio signals may include two-channel audio data. The mixed audio signals may be transferred to the recording application 400 through the PCM node 985 and then stored. In an embodiment, the recording application 400 may merge the mixed audio signals with the corresponding video signal and store it.

If the designated time period terminates, the device managing module 935 may deactivate the external microphone 220 and transfer a signal indicating that the external microphone 220 is inactive to the switching module 955, terminating the audio mixing operation for recording device switch processing. Thereafter, the second audio signal from the internal microphone 205 may be input through the audio processing module 910 to the recording application 400.

In an embodiment, a device switch from the internal microphone 205 to the external microphone 220 is described.

While the internal microphone 205 is active, and the first audio signal is input through the internal microphone 205, the recording application 400 may detect a device switch event to switch audio recording devices, and transfer the device switch event to the device managing module 935. In an embodiment, the processor 120 may receive a request for switching the recording device by the user and generate a device switch event through the recording application 400. In an embodiment, the processor 120 may detect connection of the external microphone 220 to the electronic device 101 and generate a device switch event through the recording application 400.

The device managing module 935 may activate the external microphone 220 in response to the device switch event. Thus, the external microphone 220 and the internal microphone 205 both are activated, and the second audio signal from the external microphone 220 and the first audio signal from the internal microphone 205 are input to the recording synthesizing module 940 through the device managing module 935. The recording synthesizing module 940 may mix the first audio signal and the second audio signal during a designated time period and transfer the mixed audio signals through a pulse code modulation (PCM) node 985 to the recording application 400. The recording application 400 may merge the mixed audio signals with the video signal, which is input through a camera (not shown) and corresponds to the designated time period, and record it.

If the designated time period terminates, the device managing module 935 may deactivate the internal microphone 205 and transfer a signal indicating that the internal microphone 205 is inactive to the switching module 955, terminating the audio mixing operation for recording device switch processing.

Figure 10:
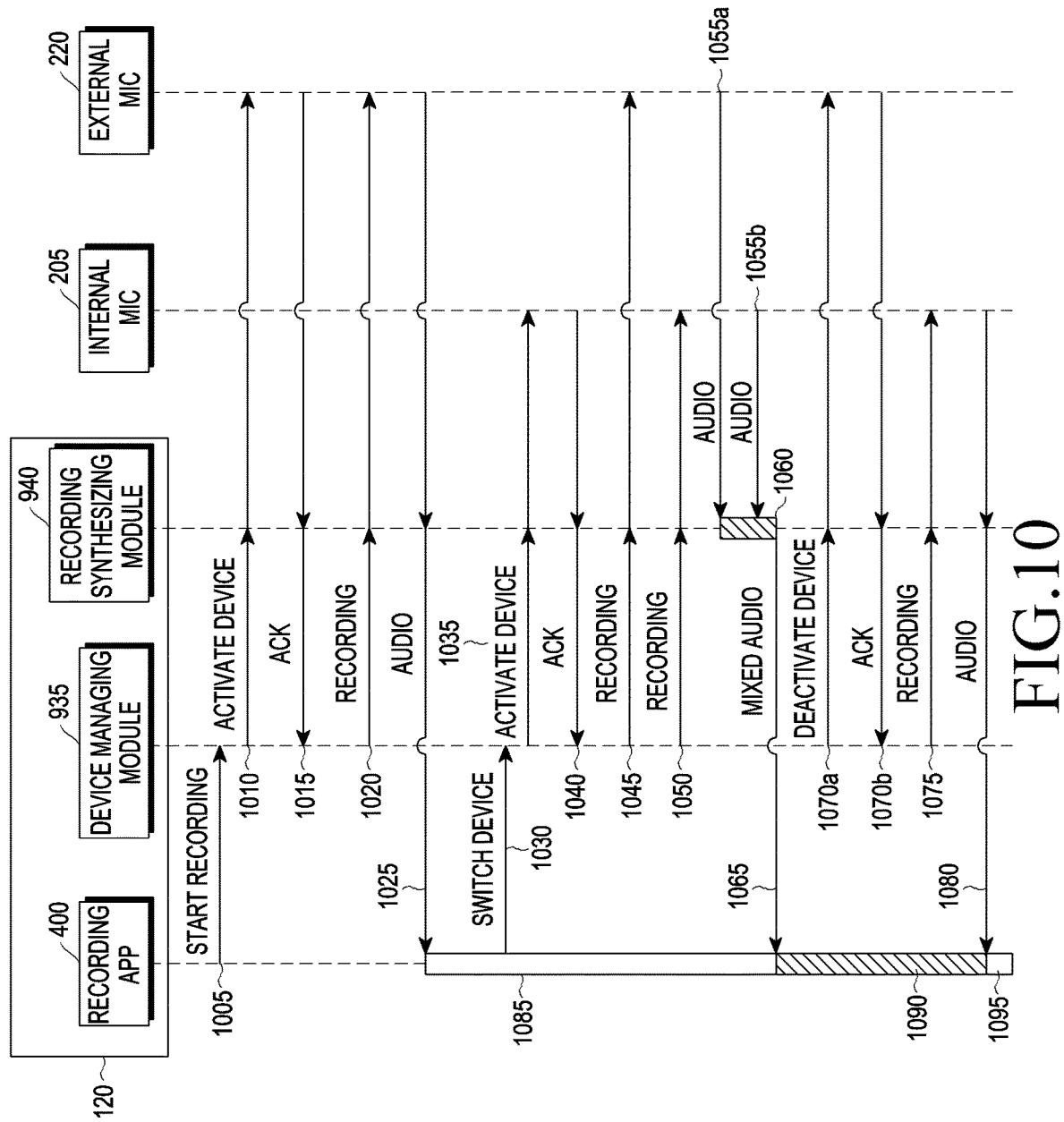
FIG. 10 is a signal flow diagram illustrating a mixing process of audio signals when a recording device is switched according to certain embodiments.

FIG. 10 is a signal flow diagram illustrating a mixing process of audio signals when a recording device is switched according to certain embodiments. In the illustrated example, a processor 120 may include a recording application 400, a device managing module 935, and a recording synthesizing module 940.

Referring to FIG. 10, in operation 1005, the recording application 400 of the processor 120 may transfer a recording start signal to the device managing module 935. In an embodiment, the recording start signal may be generated as the recording application 400 is executed. In an embodiment, the recording start signal may be generated as the recording application 400 detects that recording should be initiated. In response to the recording start signal, in operation 1010, the device managing module 935 may transmit a device activation signal to the external microphone 220 and, in operation 1015, the audio module 170 may receive a response (ACK) signal indicating that the external microphone 220 has been successfully activated in response to the device activation signal. In an embodiment, the device managing module 935 may detect connection of the external microphone 220 through the wireless communication module 192 or the connecting terminal 178 and transmit the device activation signal to the external microphone 220.

According to an embodiment, in operation 1010, the device activation signal may be transferred to the recording synthesizing module 940 and, in operation 1015, the recording synthesizing module 940 may transmit a response signal to the device managing module 935. By the device activation signal, the recording synthesizing module 940 may recognize that the external microphone 220 is activated.

Although not shown, in an embodiment, if the recording device is switched from the internal microphone 205 to the external microphone 220, the device managing module 935 may detect non-connection of the external microphone 220 through the wireless communication module 192 or the connecting terminal 178 and transmit the device activation signal to the internal microphone 205 and the recording synthesizing module 940.

In operation 1020, the device managing module 935 may transmit the recording signal to the external microphone 220 and the recording synthesizing module 940. In response to the recording signal, the recording synthesizing module 940 may prepare for processing for the audio signal received from the external microphone 220. In operation 1025, the audio signal including the audio data collected by the external microphone 220 may go through appropriate processing by the recording synthesizing module 940, and may then be transferred to the recording application 400. The recording application 400 may record the audio signal or merge it with a corresponding video signal and store it.

In operation 1030, the recording application 400 may determine to switch the recording device and transmit a device switch signal to the device managing module 935. In an embodiment, the recording device switch may be determined as the recording application 400 detects a poor communication state of the external microphone 220 through the wireless communication module 192 or the connecting terminal 178. In an embodiment, the recording device switch may be determined as the recording application 400 receives a user input for requesting to switch the microphone.

In operation 1035, the device managing module 935 may transmit a device activation signal to the internal microphone 205 and, in operation 1040, receive a response signal indicating that the internal microphone 205 has been successfully activated. In an embodiment, the device activation signal may be transferred to the recording synthesizing module 940. By receiving the device activation signal, the recording synthesizing module 940 may recognize that the internal microphone 205 is activated and transmit a response signal to the device managing module 935.

In operation 1050, the device managing module 935 may transmit the recording signal to the internal microphone 205 and the recording synthesizing module 940. In response to the recording signal, the recording synthesizing module 940 may prepare for processing of the audio signal received from the internal microphone 205. In an embodiment, in operation 1045, the device managing module 935 may transmit the recording signal to the external microphone 220 and the recording synthesizing module 940.

In operation 1055a, the first audio signal including the audio data collected by the external microphone 220 may be received by the recording synthesizing module 940 and, in operation 1055b, the second audio signal including the audio data collected by the internal microphone 205 may be received by the recording synthesizing module 940. In operation 1060, in an embodiment, the recording synthesizing module 940 may mix the first audio signal and the second audio signal applying the synchronization, volume correction, and cross-fade mixing processes according to operation 805 of FIG. 8. In operation 1065, the mixed audio signals may be transmitted from the recording synthesizing module 940 to the recording application 400.

The recording application 400 may merge the audio signal from the external microphone 220 with the video signal during the time period 1085 from the time when the audio signal starts to be received from the external microphone 220 in operation 1025, to the time when the mixed audio signals are received in operation 1065. During a designated time period 1090 after the mixed audio signals begin to be received in operation 1065, the recording application 400 may merge the mixed audio signals, including the first audio signal from the external microphone 220 and the second audio signal from the internal microphone 205, with the video signal.

In operation 1070a, the device managing module 935 may transmit a device deactivation signal to the external microphone 220 and the recording synthesizing module 940. In an embodiment, the device deactivation signal may be transmitted after a designated time period after activating the internal microphone 205 in operation 1035. The designated time period may be determined considering the time period 1090 during which the first audio signal and the second audio signal are mixed and the time to activate the internal microphone 205. In operation 1070b, a response signal indicating that the external microphone 220 has been deactivated may be received by the recording synthesizing module 940 and the device managing module 935. Although not shown, in an embodiment, the device managing module 935 may transmit a response signal indicating that the external microphone 220 has been deactivated to the recording application 400.

In operation 1075, the device managing module 935 may transmit a recording signal to the internal microphone 205 and the recording synthesizing module 940 and, in operation 1080, the audio signal collected by the internal microphone 205 may be transferred through the recording synthesizing module 940 to the recording application 400. In the time period 1095 after the audio signal starts to be received from the internal microphone 205 after the deactivation of the external microphone 220 is completed, the recording application 400 may merge the audio signal from the internal microphone 205 with the video signal.

Figure 11:
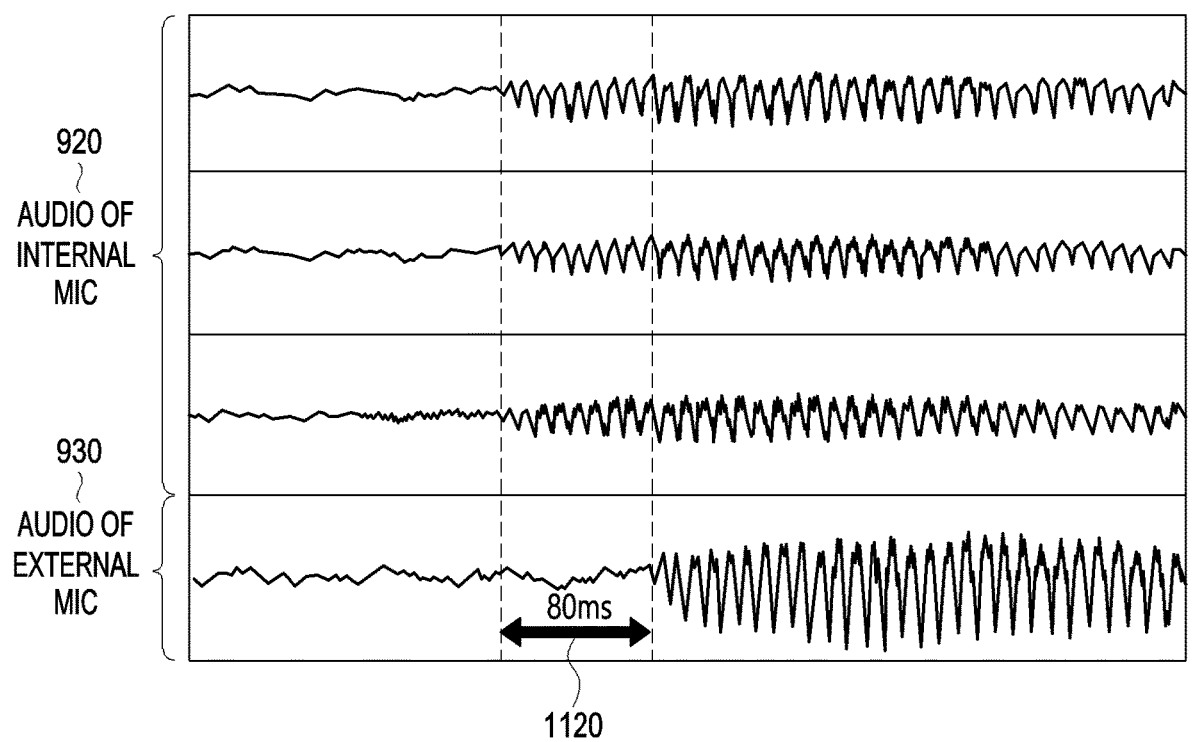
FIG. 11 is a view illustrating synchronization processing for audio signals of an internal microphone and an external microphone, according to an embodiment.

FIG. 11 is a view illustrating synchronization processing for audio signals of an internal microphone and an external microphone, according to an embodiment.

Referring to FIG. 11, the first audio signal 930 input by the external microphone 220 may include one-channel audio data, and the second audio signal 920 input by the internal microphone 205 may include three-channel audio data. The first audio signal 930 may be delayed by a predetermined time 1120 from the second audio signal 920 and input to the electronic device 101. As an example, the predetermined time 1120 may be 80 ms, which may be a value measured by the processor 120 or determined by the manufacturer of the electronic device 101. The processor 120 may store the second audio signal 920 in the delay buffer 945 before the mixing processing (e.g., the input of the switching module 955) and delay it by a predetermined value, e.g., 80 ms (1120), and then output it, thereby synchronizing it with the first audio signal 930.

Figure 12:
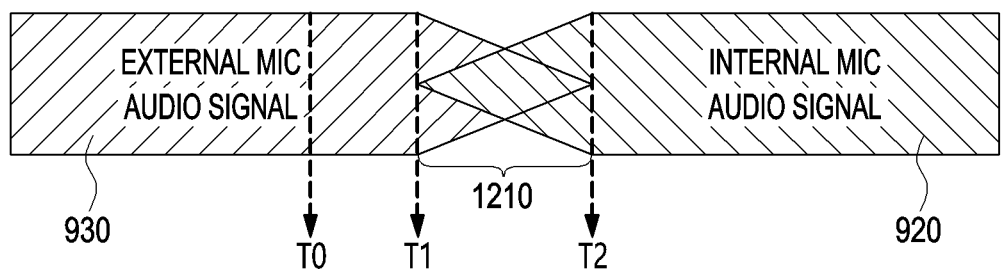
FIG. 12 is a view illustrating a cross-fade mixing process for audio signals of an internal microphone and an external microphone, according to an embodiment.

FIG. 12 is a view illustrating a cross-fade mixing process for audio signals of an internal microphone and an external microphone, according to an embodiment.

Referring to FIG. 12, while the first audio signal 930 is input from the external microphone 220, with the external microphone 220 active, the processor 120 may detect a device switch event. In response to the device switch event, at time T1, the processor 120 may activate the internal microphone 205 and start to receive the second audio signal 920 from the activated internal microphone 205. During a designated time period 1210 from time T1, the processor 120 may perform DRC processing (e.g., 965) and fade-out-processing (e.g., 970) on the first audio signal 930. Likewise, during the designated time period 1210 from time T1, the processor 120 may perform delay processing (e.g., 945), DRC processing (e.g., 965), and fade-in-processing (e.g., 970) on the second audio signal 920. At time T2 when the designated time period 1210 terminates, the processor 120 may deactivate the external microphone 220, so that the input of the second audio signal 930 and the fade-out-processing of the first audio signal 930 may be stopped and, after time T2, the audio signal from the internal microphone 205 may be exclusively input.

Figure 13:
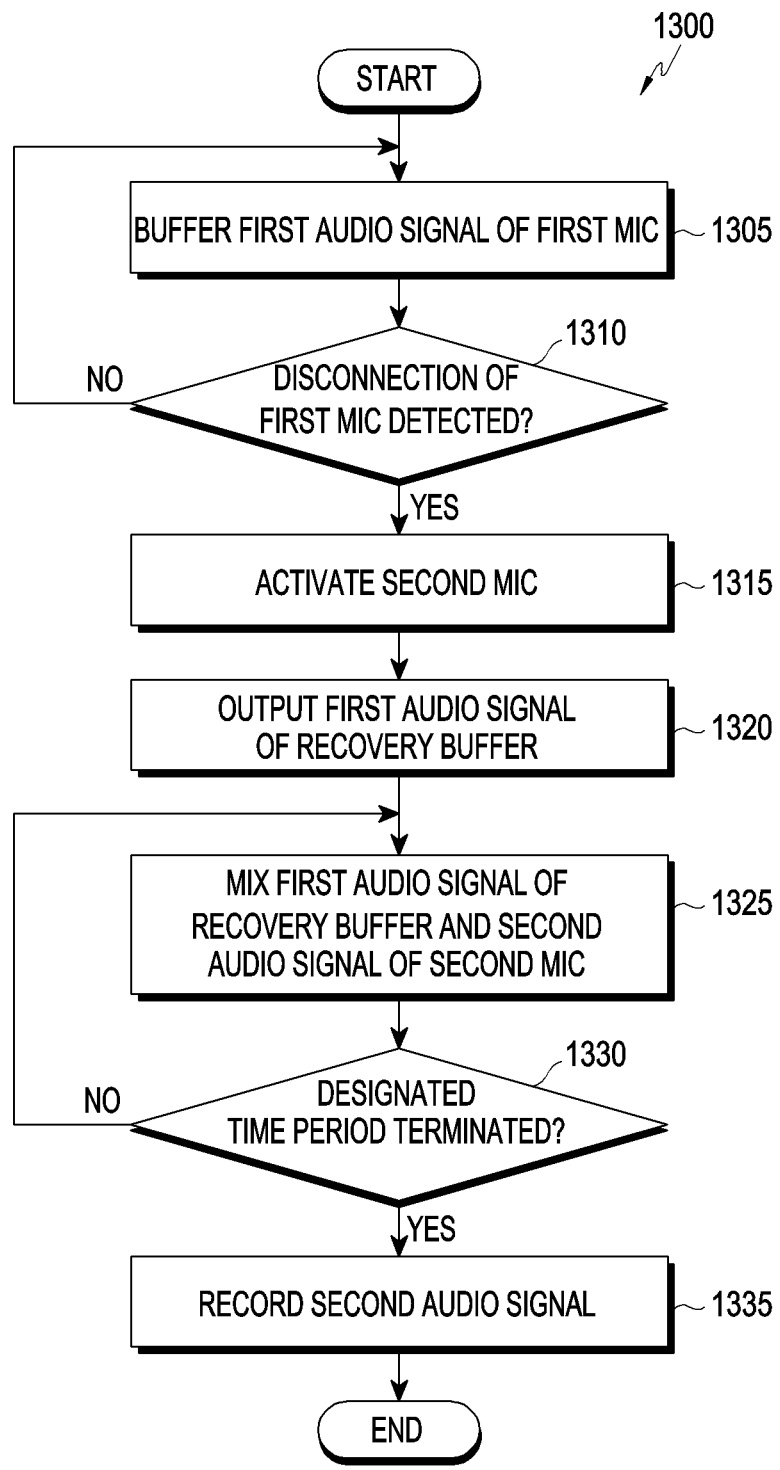
FIG. 13 is a flowchart illustrating a procedure for processing audio signals when a recording device is disconnected according to certain embodiments.

FIG. 13 is a flowchart illustrating a procedure$_{[RH2]}$ for processing audio signals when a recording device is disconnected according to certain embodiments.

Referring to FIG. 13, in operation 1305, the processor 120 may record the first audio signal input through the active first microphone while simultaneously buffering the first audio signal. In an embodiment, the first microphone may be either the internal microphone 205 included in the electronic device 101 or the external microphone 220 included in the external electronic device 102. In an embodiment, the first audio signal may be stored in a recovery buffer (e.g., 960) included in the electronic device 101. The recovery buffer 960 may buffer the first audio signal by each designated length while the first audio signal is input. In an embodiment, the recovery buffer 960 may be configured to store the first audio signal, at least, by the length utilized for mixing processing described below.

In operation 1310, the processor 120 may determine that an operation stop is detected due to operational failure in the first microphone or disconnection of the same. In an embodiment, the first microphone may be the external microphone 220 included in the external electronic device 102, and the processor 120 may determine whether connection with the external microphone 220 is disrupted through the wireless communication module 192 or the connecting terminal 178. In another embodiment, the first microphone may be the internal microphone 205 included in the electronic device 101, and the processor 120 may determine that the operation of the internal microphone 205 has become abnormal, based on a user input or internal determination.

In operation 1315, the processor 120 may activate the second microphone. In an embodiment, the second microphone may be different from the first microphone, which may be included in the electronic device 101 or connected to the electronic device 101. In operation 1320, the processor 120 may output the first audio signal stored in the recovery buffer 960 and, in operation 1325, mix the first audio signal read from the recovery buffer 960 and the second audio signal input from the second microphone during a designated time period. In an embodiment, the recovery buffer 960 may store the first audio signal, at least, by the same length as the designated time period.

In an embodiment, the first audio signal and the second audio signal may be synchronized before mixing. The synchronizing may include an operation of delaying at least one of the first audio signal and the second audio signal by a predetermined delay value. In an embodiment, the first audio signal may be fade-out-processed before mixing, and the second audio signal may be fade-in-processed before mixing. In an embodiment, during the designated time period, the processor 120 may stepwise decrease the volume of the first audio signal and stepwise increase the volume of the second audio signal. The fade-out-processed first audio signal and the fade-in-processed second audio signal may be mixed. In an embodiment, the mixed audio signals may be merged with the video signal input through the camera and recorded.

In operation 1330, the processor 120 may determine whether the designated time period has lapsed (i.e., is terminated). During the designated time period, the processor 120 may perform the mixing of operation 1325. If the designated time period is terminated, the processor 120 may terminate the mixing and exclusively record the second audio signal in operation 1335.

An operation of processing an audio signal when the operation of the recording device stops is described below with reference to the implementation example of FIG. 9.

If the external microphone 220 is active, and the first audio signal 930 is input through the external microphone 220, the first audio signal 930 may be stored in the recovery buffer 960 of the recording synthesizing module 940 by each predetermined length.

In an embodiment, the recording application 400 may detect that the external microphone 220 stops operating due to a user input, disconnection, or other causes and transfer a device switch event to the device managing module 935. The device managing module 935 may activate the internal microphone 205 in response to the device switch event. Thus, the second audio signal 920 from the active internal microphone 205 is input through the device managing module 935 to the recording synthesizing module 940. The second audio signal is delayed by a predetermined delay value by the delay buffer 945 in the recording synthesizing module 940 and then, as desired, is converted to include two-channel audio data by the channel mixer 950 and is then input to the switching module 955.

In response to the device switch event, the device managing module 935 may notify the switching module 955 that the operation of the external microphone 220 has stopped through the state module 980. In response to the notification, the switching module 955 may read the first audio signal 930 stored in the recovery buffer 960, and the first audio signal 930, together with the second audio signal delayed through the delay buffer 945, is transferred to the DRC module 965.

The DRC module 965 may receive the first audio signal 930, which is read from the recovery buffer 960 and corresponds to the external microphone 220, and the second audio signal, which is input from the delay buffer 945 and corresponds to the internal microphone 205, and perform an RMS DRC operation on the first audio signal 930 and the delayed second audio signal to thereby correct the volume difference between the audio signals and output the corrected first audio signal and the corrected second audio signal.

The cross-fading module 970 may receive the corrected first audio signal and the corrected second audio signal from the DRC module 965 and cross-fade the corrected first audio signal and the corrected second audio signal during a designated time period. In an embodiment, the cross-fading may include fade-out-processing of the corrected first audio signal corresponding to the external microphone 220 and fade-in-processing of the corrected second audio signal corresponding to the internal microphone 205.

The mixer 975 may mix the fade-out-processed first audio signal and the fade-in-processed second audio signal received from the cross-fading module 970. The mixed audio signals may include two-channel audio data. The mixed audio signals may be transferred to the recording application 400 through the PCM node 985 and then stored. In an embodiment, the recording application 400 may merge the mixed audio signals with the corresponding video signal and store it.

If the designated time period terminates, the device managing module 935 may transfer a signal indicating that the device switch has been completed to the switching module 955, terminating the audio signal output from the recovery buffer 960 and the audio mixing operation for recording device switch processing.

According to an embodiment, a method of operation in an electronic device may include receiving, through a communication module, a first audio signal input through an external microphone included in an external electronic device communicatively coupled to the electronic device, activating an internal microphone in response detecting a device switch event switching from the external microphone to the internal microphone while receiving the first audio signal, receiving a second audio signal input through the internal microphone, synchronizing and mixing, via at least one processor, the first audio signal and the second audio signal during a designated first time period, and deactivating the external microphone if the designated time period terminates.

In an embodiment, the mixing may further include delaying the second audio signal by a designated delay value and cross-fading the first audio signal and the delayed second audio signal during the designated first time period.

In an embodiment, the method may further include correcting the first audio signal and the delayed second audio signal to at least reduce a volume differential between the first audio signal and the delayed second audio signal prior to mixing the first audio signal and the delayed second audio signal.

In an embodiment, correcting the first audio signal and the delayed second audio signal may further include applying root mean square (RMS) dynamic range compression (DRC).

In an embodiment, the method may further include merging the mixed first and second audio signals with a first video signal corresponding to the designated first time period.

In an embodiment, the method may further include storing a third audio signal received through the external microphone in a recovery buffer, activating the internal microphone in response detecting of disconnection of the external electronic device from the electronic device, retrieving the third audio signal from the recovery buffer, mixing a fourth audio signal input through the internal microphone with the third audio signal retrieved from the recovery buffer during a designated second time period, and merging the mixed fourth and third audio signals with a second video signal corresponding to the second time period.

In an embodiment, the mixing may include delaying the fourth audio signal by a designated delay value, correcting at least one of the third audio signal and the delayed fourth audio signal to at least reduce a volume differential between the third audio signal and the delayed fourth audio signal, mixing the corrected third audio signal and fourth audio signal using at least cross-fading during the second time period, and terminating output of the third audio signal from the recovery buffer upon detecting lapse of the designated second time period.

In an embodiment, the method may further include receiving a fifth audio signal input through the internal microphone, transmitting a signal to the external electronic device to activate the external microphone while receiving the fifth audio signal, receiving a sixth audio signal input through the external microphone, synchronizing the fifth audio signal and the sixth audio signal, mixing the synchronized fifth audio signal and sixth audio signal during a designated second time period, and deactivating the internal microphone upon detecting lapse of the designated second time period.

In an embodiment, the mixing may include delaying the fifth audio signal by a designated delay value, correcting at least one of the delayed fifth audio signal and the sixth audio signal to at least reduce a volume differential between the delayed fifth audio signal and the sixth audio signal, and mixing the corrected fifth audio signal and sixth audio signal using at least cross-fading during the second time period.

In an embodiment, the method may further include storing a seventh audio signal received through the internal microphone in a recovery buffer, transmitting a signal to the external electronic device to activate the external microphone, retrieving the seventh audio signal from the recovery buffer, correcting at least one of an eighth audio signal received through the external microphone and the seventh audio signal retrieved from the recovery buffer to at least reduce a volume differential between the eighth audio signal and the seventh audio signal, mixing the corrected seventh audio signal and eighth audio signal using at least cross-fading during a designated third time period, merging the mixed seventh and eighth audio signals with a second video signal corresponding to the third time period, and terminating output of the seventh audio signal from the recovery buffer upon detecting lapse of the designated third time period.

What is claimed is:
1. An electronic device, comprising:
an internal microphone;
a communication module;
at least one processor; and
memory storing instructions that, when executed by the at least one processor, cause the electronic device to:

receive, through the communication module, a first audio signal input through an external microphone included in an external electronic device communicatively connected to the electronic devices; and in response to detecting a device switch event switching from the external microphone to the internal microphone while receiving the first audio sign;

activate the internal microphone, receive a second audio signal input through the internal microphone, synchronize the first audio signal input through the external microphone received through the communication module and the second audio signal input through the internal microphone, mix the first audio signal and the second audio signal which are synchronized, during a designated first time period, and deactivate the external microphone upon detecting lapse of the designated first time period, wherein deactivation of the external microphone causes the electronic device to terminate reception of the first audio signal through the external microphone.

2. The electronic device of claim 1, wherein the instructions, when executed by the at least one processor, cause the electronic device to:

delay the second audio signal by a designated delay value, wherein mixing the first audio signal and the delayed second audio signal includes applying cross-fading during the designated first time period.

3. The electronic device of claim 2, wherein the instructions, when executed by the at least one processor, cause the electronic device to:

correct at least one of the first audio signal or the delayed second audio signal to reduce a volume differential between the first audio signal and the delayed second audio signal, before mixing the first audio signal and the delayed second audio signal.

4. The electronic device of claim 1, wherein the instructions, when executed by the at least one processor, cause the electronic device to:

store a third audio signal received through the external microphone in a recovery buffer;

activate the internal microphone in response to detection of disconnection of the external electronic device from the electronic device;

after detecting the disconnection, retrieve the third audio signal from the recovery buffer;

mix a fourth audio signal input through the internal microphone with the third audio signal obtained from the recovery buffer during a designated second time period; and merge the mixed fourth and third audio signals with a second video signal corresponding to the second time period.

5. The electronic device of claim 4, wherein the instructions, when executed by the at least one processor, cause the electronic device to:

delay the fourth audio signal by a designated delay value, correct at least one of the third audio signal or the delayed fourth audio signal to reduce a volume differential between the third audio signal and the delayed fourth audio signal, mix the corrected third audio signal and fourth audio signal through cross-fading during the second time period, and terminate output of the third audio signal from the recovery buffer upon lapse of the designated second time period.

6. The electronic device of claim 1, wherein the instructions, when executed by the at least one processor, cause the electronic device to:

obtain a fifth audio signal received through the internal microphone, transmit a signal to the external electronic device to activate the external microphone while obtaining the fifth audio signal, obtain a sixth audio signal received through the external microphone, synchronize the fifth audio signal and the sixth audio signal, mix the synchronized fifth audio signal and sixth audio signal during a designated second time period, and deactivate the internal microphone upon lapse of the designated second time period.

7. The electronic device of claim 6, wherein the instructions, when executed by the at least one processor, cause the electronic device to:

delay the fifth audio signal by a designated delay value, correct at least one of the delayed fifth audio signal or the sixth audio signal to reduce a volume differential between the delayed fifth audio signal and the sixth audio signal, and mix the corrected fifth audio signal and sixth audio signal using at least cross-fading during the second time period.

8. The electronic device of claim 1, wherein the instructions, when executed by the at least one processor, cause the electronic device to:

store a seventh audio signal received through the internal microphone in a recovery buffer, transmit a signal to the external electronic device to activate the external microphone, retrieve the seventh audio signal from the recovery buffer, correct at least one of an eighth audio signal input through the external microphone or the seventh audio signal obtained from the recovery buffer to reduce a volume differential between the eighth audio signal and the seventh audio signal, mix the corrected seventh audio signal and eighth audio signal using at least cross-fading during a designated third time period, merge the mixed seventh and eighth audio signals with a second video signal corresponding to the third time period, and terminate output of the seventh audio signal from the recovery buffer upon lapse of the designated third time period.

9. A method in an electronic device, the method comprising:

receiving, through a communication module, a first audio signal through an external microphone included in an external electronic device communicatively coupled to the electronic devices; and in response to detecting a device switch event switching from the external microphone to an internal microphone while receiving the first audio sign;

activating the internal microphone, receiving a second audio signal through the internal microphone, synchronizing the first audio signal input through the external microphone received through the communication module and the second audio signal input through the internal microphone, mixing, via at least one processor, the first audio signal and the second audio signal which are synchronized, during a designated first time period, and deactivating the external microphone upon detecting lapse of the designated time period, wherein deactivation of the external microphone causes the electronic device to terminate reception of the first audio signal through the external microphone.

10. The method of claim 9, wherein the synchronizing includes delaying the second audio signal by a designated delay value; and the mixing includes cross-fading the first audio signal and the delayed second audio signal during the designated first time period.

11. The method of claim 10, further comprising:

correcting at least one of the first audio signal or the delayed second audio signal to reduce a volume differential between the first audio signal and the delayed second audio signal prior to mixing the first audio signal and the delayed second audio signal.

12. The method of claim 9, further comprising:

storing a third audio signal received through the external microphone in a recovery buffer;

activating the internal microphone in response detecting disconnection of the external electronic device from the electronic device;

retrieving the third audio signal from the recovery buffer;

mixing a fourth audio signal input through the internal microphone with the third audio signal retrieved from the recovery buffer during a designated second time period; and merging the mixed fourth and third audio signals with a second video signal corresponding to the second time period.

13. The method of claim 12, wherein the mixing includes:

delaying the fourth audio signal by a designated delay value, correcting at least one of the third audio signal or the delayed fourth audio signal to reduce a volume differential between the third audio signal and the delayed fourth audio signal, mixing the corrected third audio signal and fourth audio signal using at least cross-fading during the second time period, and terminating output of the third audio signal from the recovery buffer upon detecting lapse of the designated second time period.

14. The method of claim 9, further comprising:

receiving a fifth audio signal input through the internal microphone, transmitting a signal to the external electronic device to activate the external microphone while receiving the fifth audio signal, receiving a sixth audio signal input through the external microphone, synchronizing the fifth audio signal and the sixth audio signal, mixing the synchronized fifth audio signal and sixth audio signal during a designated second time period, and deactivating the internal microphone upon detecting lapse of the designated second time period.

15. The method of claim 14, wherein the mixing includes:

delaying the fifth audio signal by a designated delay value, correcting at least one of the delayed fifth audio signal or the sixth audio signal to at reduce a volume differential between the delayed fifth audio signal and the sixth audio signal, and mixing the corrected fifth audio signal and sixth audio signal using at least cross-fading during the second time period.

16. A non-transitory computer-readable storage medium for storing instructions which, when executed by at least one processor of an electronic device, cause the electronic device to perform:

receiving, through a communication module, a first audio signal input through an external microphone included in an external electronic device communicatively coupled to the electronic device; and in response to detecting a device switch event switching from the external microphone to an internal microphone while receiving the first audio signal:

activating the internal microphone, receiving a second audio signal input through the internal microphone, synchronizing the first audio signal input through the external microphone received through the communication module and the second audio signal input through the internal microphone, mixing, via at least one processor, the first audio signal and the second audio signal which are synchronized, during a designated first time period, and deactivating the external microphone upon detecting lapse of the designated time period, wherein deactivation of the external microphone causes the electronic device to terminate reception of the first audio signal through the external microphone.

17. The non-transitory computer-readable storage medium of claim 16, wherein the synchronizing includes delaying the second audio signal by a designated delay value; and the mixing includes cross-fading the first audio signal and the delayed second audio signal during the designated first time period.

18. The non-transitory computer-readable storage medium of claim 17, wherein the instructions which, when executed by the at least one processor, cause the electronic device to perform:

correcting at least one of the first audio signal or the delayed second audio signal to reduce a volume differential between the first audio signal and the delayed second audio signal prior to mixing the first audio signal and the delayed second audio signal.

19. The non-transitory computer-readable storage medium of claim 16, wherein the instructions which, when executed by the at least one processor, cause the electronic device to perform:

storing a third audio signal received through the external microphone in a recovery buffer;

activating the internal microphone in response detecting disconnection of the external electronic device from the electronic device;

retrieving the third audio signal from the recovery buffer;

mixing a fourth audio signal input through the internal microphone with the third audio signal retrieved from the recovery buffer during a designated second time period; and merging the mixed fourth and third audio signals with a second video signal corresponding to the second time period.

20. The non-transitory computer-readable storage medium of claim 16, wherein the instructions which, when executed by the at least one processor, cause the electronic device to perform:
   receiving a fifth audio signal input through the internal microphone,
   transmitting a signal to the external electronic device to activate the external microphone while receiving the fifth audio signal,
   receiving a sixth audio signal input through the external microphone,
   synchronizing the fifth audio signal and the sixth audio signal,
   mixing the synchronized fifth audio signal and sixth audio signal during a designated second time period, and
   deactivating the internal microphone upon detecting lapse of the designated second time period.

* * * * *